United States Patent
Matsuda et al.

(10) Patent No.: US 9,933,581 B2
(45) Date of Patent: Apr. 3, 2018

(54) OPTICAL FIBER CONNECTOR

(71) Applicants: FUJIKURA LTD., Tokyo (JP); NIPPON TELEGRAPH AND TELEPHONE CORPORATION, Tokyo (JP)

(72) Inventors: Takaharu Matsuda, Sakura (JP); Hung Huu Luong, Sakura (JP); Tatsuya Ota, Sakura (JP); Kazuhiro Takizawa, Sakura (JP); Hiroichi Katayose, Ichikawa (JP); Koji Ishizuka, Ichikawa (JP); Makoto Shinpo, Tokyo (JP); Kunihiro Toge, Tokyo (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/300,494

(22) PCT Filed: Mar. 31, 2015

(86) PCT No.: PCT/JP2015/060233
§ 371 (c)(1),
(2) Date: Sep. 29, 2016

(87) PCT Pub. No.: WO2015/152282
PCT Pub. Date: Oct. 8, 2015

(65) Prior Publication Data
US 2017/0123162 A1 May 4, 2017

(30) Foreign Application Priority Data
Apr. 1, 2014 (JP) .................................. 2014-075684

(51) Int. Cl.
G02B 6/36 (2006.01)
G02B 6/38 (2006.01)
G02B 6/44 (2006.01)

(52) U.S. Cl.
CPC ........... *G02B 6/382* (2013.01); *G02B 6/3821* (2013.01); *G02B 6/3881* (2013.01); *G02B 6/443* (2013.01); *G02B 6/4471* (2013.01)

(58) Field of Classification Search
CPC .............................. G02B 6/382; G02B 6/3846
See application file for complete search history.

(56) References Cited

U.S. PATENT DOCUMENTS

| 7,236,669 B2 * | 6/2007 | Asano | G02B 6/3825 385/50 |
| 7,270,487 B2 * | 9/2007 | Billman | G02B 6/3846 385/55 |

(Continued)

FOREIGN PATENT DOCUMENTS

| JP | 2008-170879 A | 7/2008 |
| JP | 2008-268674 A | 11/2008 |

(Continued)

OTHER PUBLICATIONS

Communication dated Nov. 15, 2016 from the Japanese Patent Office in counterpart application No. 2014-075684.

(Continued)

*Primary Examiner* — Rhonda Peace
(74) *Attorney, Agent, or Firm* — Osha Liang LLP

(57) ABSTRACT

An optical fiber splicer includes a fiber fixing portion, a first optical fiber fixed to the fiber fixing portion, a clamp portion which is capable of holding and fixing an extending portion extended from the fiber fixing portion of the first optical fiber and a tip portion of a second optical fiber optically connected to the extending portion of the first optical fiber between a base member and a pressing member being openable and (Continued)

closable with respect to the base member, and a solid index matching material which is attached to a tip surface of the extending portion of the first optical fiber and is interposed between the first optical fiber and the second optical fiber.

8 Claims, 9 Drawing Sheets

(56) References Cited

U.S. PATENT DOCUMENTS

| | | | | |
|---|---|---|---|---|
| 7,331,719 | B2* | 2/2008 | Manning | G02B 6/3806 385/62 |
| 7,393,143 | B2* | 7/2008 | Kato | G02B 6/3846 385/31 |
| 7,703,989 | B2* | 4/2010 | Kato | G02B 6/382 385/73 |
| 7,857,525 | B2* | 12/2010 | Suzuki | G02B 6/3846 385/27 |
| 8,111,956 | B2* | 2/2012 | Tan | G01M 11/088 385/24 |
| 8,408,814 | B2* | 4/2013 | Sumida | G02B 6/3806 385/60 |
| 8,434,948 | B2* | 5/2013 | Ohtsuka | G02B 6/3806 385/59 |
| 9,568,683 | B2* | 2/2017 | Yamaguchi | G02B 6/262 |
| 2007/0196055 | A1* | 8/2007 | Kato | G02B 6/3846 385/78 |
| 2008/0159696 | A1* | 7/2008 | Suzuki | G02B 6/3846 385/72 |
| 2008/0304794 | A1 | 12/2008 | Kato et al. | |
| 2010/0086258 | A1 | 4/2010 | Ohtsuka et al. | |
| 2010/0124394 | A1* | 5/2010 | Meek | G02B 6/3846 385/73 |
| 2011/0293222 | A1* | 12/2011 | Sumida | G02B 6/3846 385/78 |
| 2013/0322821 | A1 | 12/2013 | Grinderslev | |
| 2016/0077286 | A1* | 3/2016 | Yamaguchi | G02B 6/262 385/98 |
| 2017/0123162 | A1* | 5/2017 | Matsuda | G02B 6/382 |

FOREIGN PATENT DOCUMENTS

| | | |
|---|---|---|
| JP | 2011-033731 A | 2/2011 |
| TW | 201400899 A | 1/2014 |

OTHER PUBLICATIONS

"Type Connectors for Optical Fiber Cables (Type SC Connectors)", JIS C 5973: 2014, pp. 1-3 and 24.
"Rubber, vulcanized or thermoplastic-Determination of hardness—Part 3: Durometer method", JIS K 6253-3: 2012, Mar. 21, 2012.
Japanese Office Action of JP Application No. 2014-075684 dated Oct. 20, 2015.
Japanese Office Action of JP Application No. 2014-075684 dated Apr. 26, 2016.
Communication dated Aug. 30, 2016 from the Taiwanese Intellectual Property Office in counterpart Application No. 104110467.
Extended European Search Report issued in corresponding European Application No. 15774052.3 dated Oct. 12, 2017 (9 pages).
Office Action issued in corresponding Canadian Application No. 2,944,406 dated Jul. 25, 2017 (3 pages).

* cited by examiner

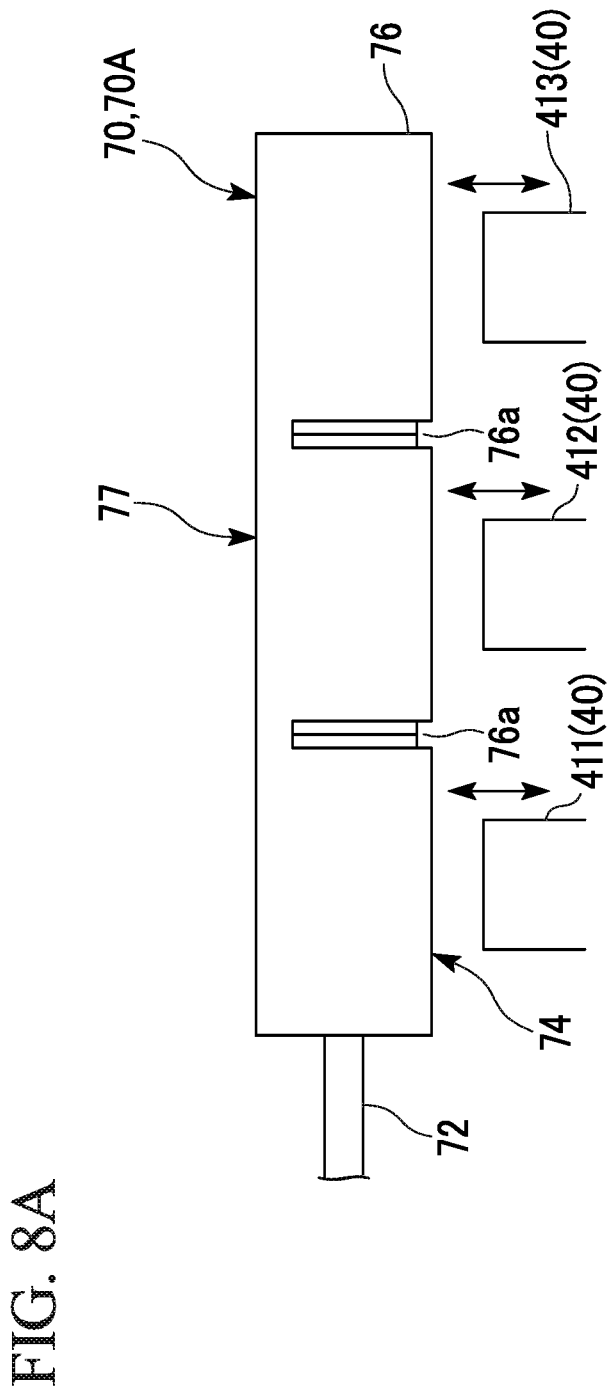

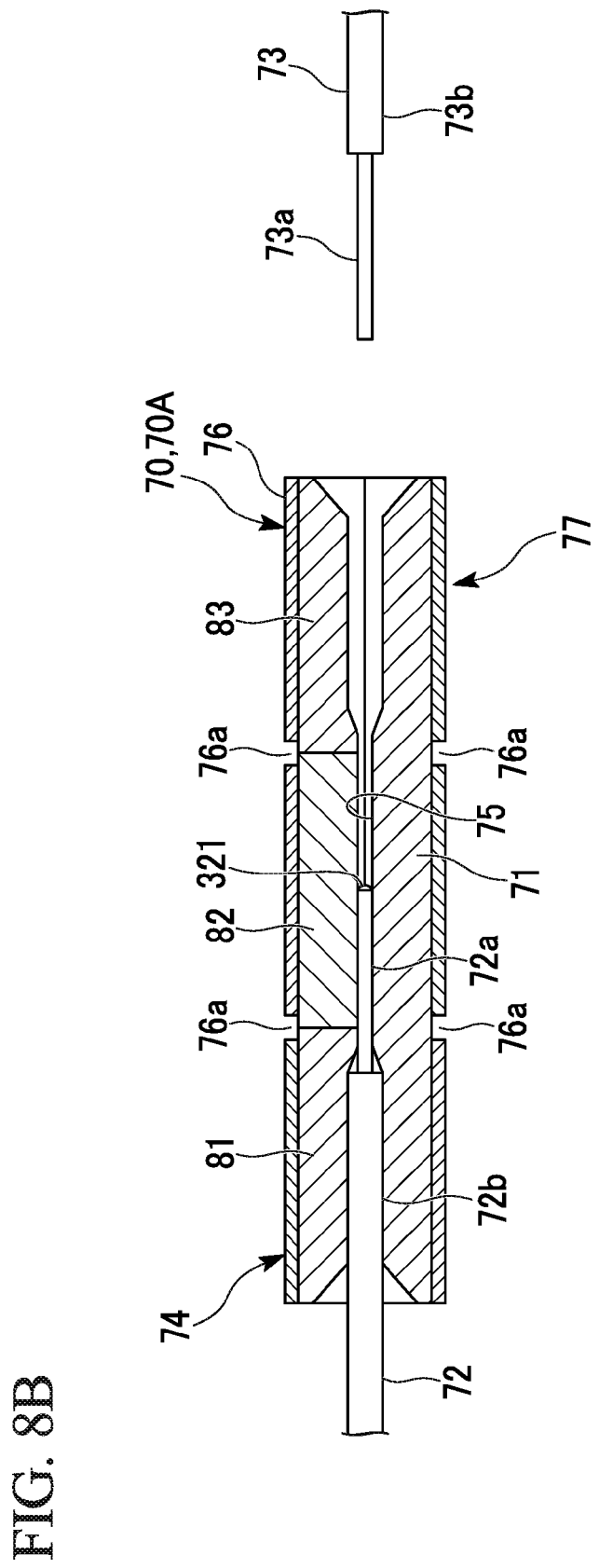

OPTICAL FIBER CONNECTOR

CROSS REFERENCE TO RELATED APPLICATIONS

This application is a National Stage of International Application No. PCT/JP2015/060233, filed Mar. 31, 2015, claiming priority based on Japanese Patent Application No. 2014-075684, filed Apr. 1, 2014, the contents of all of which are incorporated herein by reference in their entirety.

TECHNICAL HELD

The present inversion relates to an optical fiber connector which optically connects optical fibers to each other.

BACKGROUND ART

A so-called field assembly optical connector as an optical connector which allows assembly-work to be easily performed with respect to a tip of an optical fiber on site is well known. In the related art, as a field assembly optical connector, a field assembly optical connector is known, which includes a short optical fiber (bare optical fiber, and hereinafter, also referred to as a built-in optical fiber) which is inwardly inserted into and fixed to a ferrule, and a mechanical splice type clamp portion which is provided on a rear side opposite to a front end surface of the ferrule for butting (for example, refer to FIGS. 2 to 5 of Patent Document 1).

The clamp portion of the field assembly optical connector includes a base member, a pressing member, and a plate spring which elastically biases the pressing member toward the pressing member. A rear end portion of the built-in optical fiber is disposed between the base member and the pressing member of the clamp portion. Another optical fiber (for example, an optical fiber core wire, and hereinafter, also referred to as an insertion optical fiber), which is inserted between the base member and the pressing member of the damp portion from a rear side opposite to the ferrule side, can be butt-connected to a rear end of the built-in optical fiber. In the Held assembly optical connector, the rear end portion of the built-in optical fiber, and a tip portion of the insertion optical fiber which is butt-connected to the rear end of the built-in optical fiber are held between the base member and the pressing member of the damp portion so as to be fixed by elasticity of the plate spring, and the rear end portion of the built-in optical fiber is assembled to the lip of the insertion optical fiber.

In the field assembly optical connector, in order to decrease connection loss, a liquid refractive index matching agent such as silicone-based grease is provided on a butt-connection portion between the built-in optical fiber and the insertion optical fiber (for example, refer to FIG. 16(c) of Patent Document 1).

In addition, in the field assembly optical connection, it is suggested that a light-transmitting solid refractive index matching material formed of a polymer material is be provided on the rear end of the built-in optical fiber, and the insertion optical fiber and the built-in optical fiber having tips abutting on the solid refractive index matching, material are be optically connected to each other via the solid refractive index matching material (for example, refer to FIGS. 7(a) and 7(b) or the like of Patent Document 1).

PRIOR ART DOCUMENTS

Patent Documents

[Patent Document 1] Japanese Unexamined Patent Application, First Publication No. 2011-33731

DISCLOSURE OF INVENTION

Problems to be Solved by the Invention

In general, a rear end surface fan end surface of a rear end side opposite to the tip exposed to a joining end surface of the ferrule) of the built-in optical fiber of the field assembly optical connector is configured of a flat surface perpendicular to an optical axis of the built-in optical fiber. Meanwhile, a coating material of the tip of the insertion optical fiber is removed on site, the hare optical fiber is led out, the tip of the bare optical fiber is cut, thereafter, the tip of the bare optical fiber is inserted into the clamp portion from the rear side of the clamp portion, and the tip of the bare optical fiber is butted to the rear end of the built-in optical fiber. Cutting of the bare optical fiber (hereinafter, also referred to as an insertion-side bare optical fiber) is performed using a dedicated cleaver (cutter), and a flat mirror-shaped tip surface perpendicular to the optical axis of the bare optical fiber is formed on the bare optical fiber. However, cutting of the insertion side bare optical fiber may not be correctly performed on site, and irregularities may be formed on the tip of the insertion side bare optical fiber.

In the configuration in which the liquid refractive index matching agent is provided in the butt-connection portion between the built-in optical fiber and the insertion optical fiber, a portion between the tip of the insertion side bare optical fiber on which irregularities are formed and the rear end surface of the built-in optical fiber abutting on the tip of the insertion side bare optical fiber can be embedded with the liquid refractive index matching agent. As a result, it is possible to decrease connection loss.

However, in this ease, concave portions of the irregularities on the tip of the insertion side bare optical fiber abut on an edge portion on an outer circumference of the rear end surface of the built-in optical fiber, cracks occur on the edge portion, and deterioration of mechanical characteristics of the rear end of the built-in optical fiber may occur. In addition, fragments generated by the cracks arc interposed between the built-in optical fiber and the insertion side bare side optical fiber, and the fragment may obstruct the butt-connection.

In the configuration in which the solid refractive index matching material is provided on the rear end of the built-in optical fiber of the field assembly optical connector, it is possible to allow the solid refractive index matching material to function as a cushion layer. Accordingly, in this configuration, since the portion between the tip of the insertion side bare optical fiber on which irregularities are formed and the rear end surface of the built-in optical fiber can be embedded with the solid refractive index matching material, it is possible to realize an optical connection having low loss. In addition, since the solid refractive index matching material functioning as the cushion layer abuts on the convex portion of the tip of the insertion side bare optical fiber, cracks in the edge portion on the outer circumference of the rear end surface of the built-in optical fiber are effectively prevented from occurring.

However, the inventors found that when the insertion optical fiber in which the tip thereof is abut on the solid refractive index matching material is held and fixed between the base member and the pressing member of the clamp portion, there is sometimes a case that, the solid refractive index matching material is peeled off from the rear end of the built-in optical fiber.

The present invention is made in consideration of the above-described problems, and is to provide an optical fiber connector capable of preventing the solid refractive index matching material from being peeled o ff from the tip of the first optical fiber when the second optical fiber is held and fixed between the base member and the pressing member of the clamp portion.

Means for Solving the Problems

In order to achieve the aforementioned object, the present invention provides the following structures (aspects).

The first aspect of the present Invention is an optical fiber connector including, a fiber fixing portion, a first optical fiber fixed to the fiber fixing portion, a clamp portion which is capable of holding and fixing an extending portion extended from the fiber fixing portion of the first optical fiber and a tip portion of a second optical fiber optically connected to the extending portion of the first optical fiber between a base member and a pressing member being openable arid closable with respect to the base member, and a solid index matching material which is attached to a tip surface of the extending portion of the first optical fiber and is interposed between the first optical fiber and the second optical fiber. The solid refractive index matching material is formed in a partially spherical shape comprising an apex on an extension from a center of the tip surface of the extending portion of she first optical fiber, and between the base member of the clamp portion and the pressing member opened with respect to the base member, the second optical fiber having the same cladding diameter as the first optical fiber is movably disposed in an allowable displacement amount ΔH which is 50% or less of the cladding diameter of the first optical fiber with respect to the first optical fiber.

The second aspect of the present invention is that, in the optical fiber connector of the first aspect, the clamp portion comprises a spring which elastically biases the pressing member toward the base member, and the pressing member of the clamp portion is open with respect to the base member by the interposing member which is interposed between the pressing member and the base member so as to be insertable and detachable by the elasticity of the spring.

The third aspect of the present invention is that, in the optical fiber connector of the first aspect or the second aspect, an opening angle between opposing surfaces of the base member of the clamp portion and the pressing member opened with respect to the base member, the opposing surfaces opposing each other, is 5 degrees or less.

The fourth aspect of the present invention is that, in the optical fiber connector of any one of the first to third aspect, the fiber-fixing portion is a ferrule to which the first optical fiber is inwardly inserted and fixed, and the base member of the clamp portion is integrally provided on the ferrule.

Effects of the Invention

According to the aspects of the present invention, when the second optical fiber is held and fixed between the base member and the cover member of the clamp portion, it is possible to prevent the solid refractive index matching material from being peeled off from the tip of the first optical fiber.

As a consequence, a low-loss optical connection between the first optical fiber and the second optical fiber through the solid refractive index matching material can be reliably realized.

BRIEF DESCRIPTION OF THE DRAWINGS

FIG. 8A is a plan view showing an optical fiber connector of another embodiment of the present invention.

FIG. 8B is a side sectional view showing the optical fiber connector of another embodiment of the present invention.

EMBODIMENTS FOR CARRYING OUT THE INVENTION

Hereinafter, an embodiment of the present invention is described with reference to the drawings.

Figure 1:
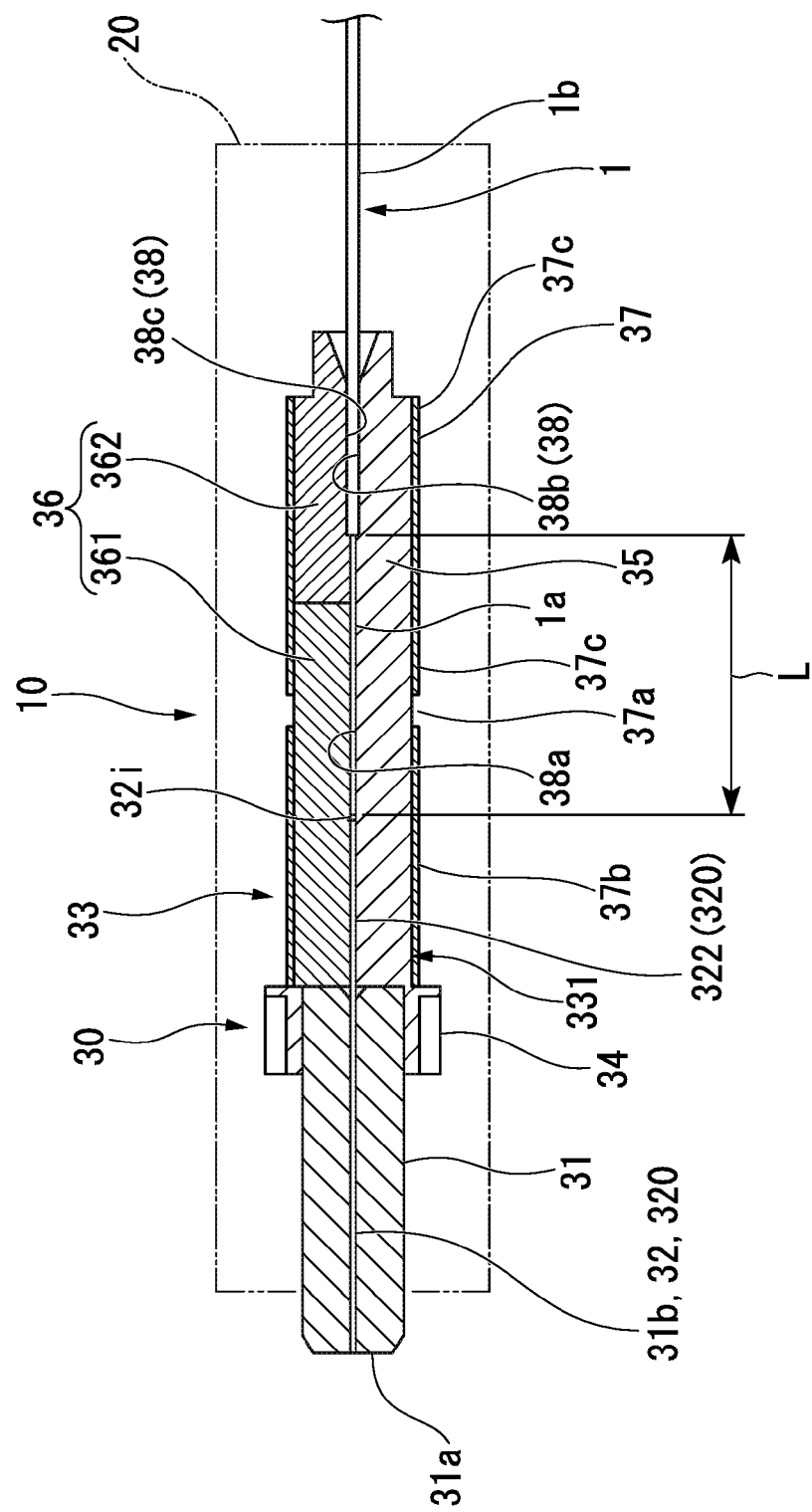
FIG. 1 is a sectional view showing a structure of an optical connector according to one embodiment of an optical fiber connector of the present invention.

An optical connector 10 shown in FIG. 1 is one embodiment in which an optical fiber connector according to the present invention is embodied. The optical connector 10 shown in FIG. 1 has a configuration in which a clamp portion-attached ferrule 30 configured so that a clamp portion 33 is assembled to a rear side (a side opposite to a joining end surface 31*a* of a front end, and the right side in FIG. 1) of a ferrule 31 is accommodated in a sleeve-shaped housing 20.

Figure 2:
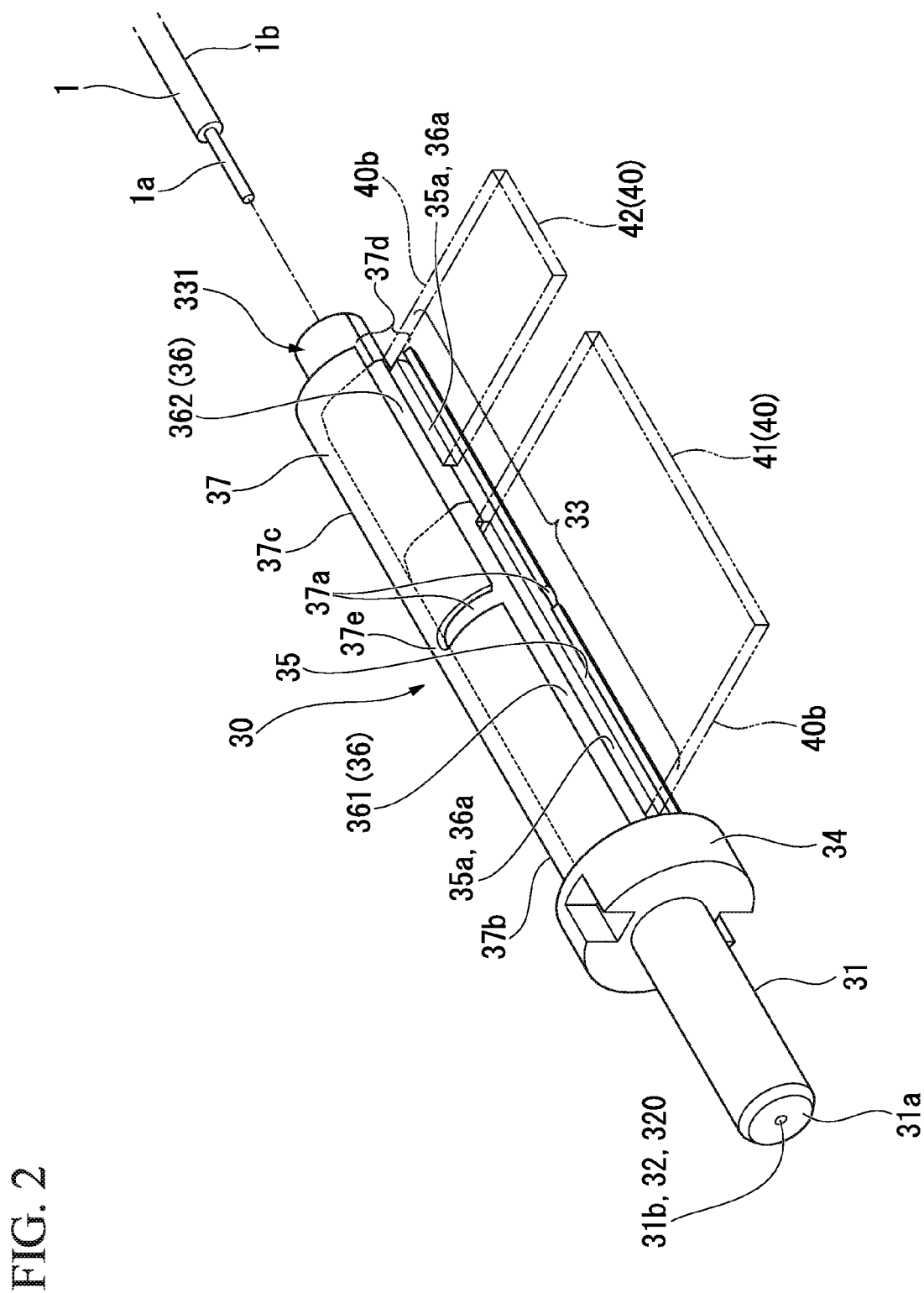
FIG. 2 is a perspective view describing a structure of a clamp portion-attached ferrule (optical fiber connector) of the optical connector of FIG. 1.

As shown in FIGS. 1 and 2, the clamp portion-attached ferrule 30 is configured so as to include the ferrule 31, a built-in optical fiber 32 (first optical fiber) which is inwardly inserted into and fixed to a fiber hole 31*b* formed in the ferrule 31, and the clamp portion 33.

Figure 3:
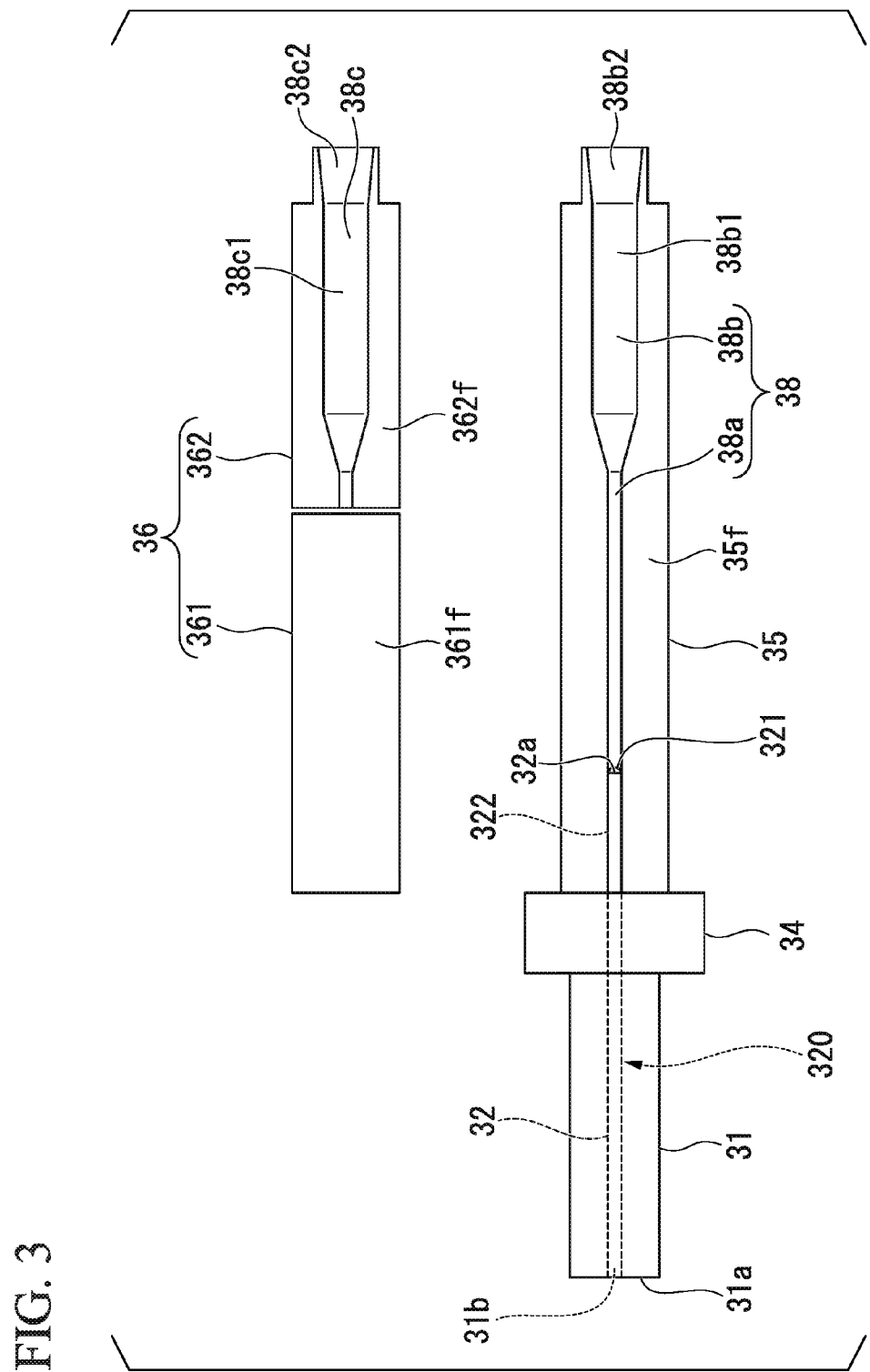
FIG. 3 is an explanatory view showing a schematic structure in a state where opposing surfaces of elements of the clamp portion-attached ferrule (optical fiber connector) in the optical connector of FIG. 1 are arranged side by side.

As shown in FIGS. 1 and 3, the built-in optical fiber 32 has a portion which extends to a rear side of the ferrule 31. In addition, as shown in FIG. 3, a solid refractive index matching material 321 formed of a light-transmitting polymer material is provided on a tip surface (rear end surface 32*a*) of the portion extending to the rear side of the ferrule 31 of the built-in optical fiber 32.

Hereafter, an optical fiber (built-in optical fiber 32) in which the solid refractive index matching material 321 is provided on the rear end surface 32*a* is also referred to as a matching material-attached optical fiber 320.

As shown in FIGS. 1 and 2, the clamp portion 33 of the clamp portion-attached ferrule 30 has a configuration in which an element portion 331 having a half-split structure including an elongated base side element 35 (base member) and a pressing element 36 (pressing member) which extends along the base side member 35 are accommodated and held inside a spring 37 which is formed by processing a metal sheet and extends in a C or U sectional shape tin the in the shown examples, a C sectional shape). The spring 37 functions as a biasing member which elastically biases the pressing element 36 toward the base side element 35.

Hereinafter, a portion which is extended in the rear side, from a ferrule 31 of the matching material-attached optical fiber 320 shown in FIG. 1 is referred to as a rear-side extension portion 322. The rear-side extension portion 322 of the matching material-attached optical fiber 320 includes the solid refractive index matching material 321.

As shown in FIG. 1, the rear-side extension portion 322 of the matching material-attached optical fiber 320 (including the solid refractive index matching material 321) is disposed between the base side element 35 of the clamp portion 33 and the front element 36. In FIG. 1, approximately an entire length of the rear-side extension portion 322 including the solid refractive index matching material 321 is disposed between the base side element 35 and the front element 36.

The rear-side extension portion 322 of the matching material-attached optical fiber 320 extends along a front-rear direction (a direction of a center axis of a fiber hole 31*b* of the ferrule 31) of the clamp portion-attached ferrule 30 from the ferrule 21.

In addition, in the present specification, a rear end portion of the rear-side extension portion 322 of the matching material-attached optical fiber 320 is treated, as a rear end portion of the matching material-attached optical fiber 320.

As shown in FIG. 1, another optical fiber (second optical fiber) 1, which is inserted between the elements 35 and 36 (base side element 35 and pressing element 36) of the clamp portion 33 of the clamp portion-attached ferrule 30, can be optically connected to the built-in optical fiber 32 via the solid refractive index matching, material 321.

Figure 4A:
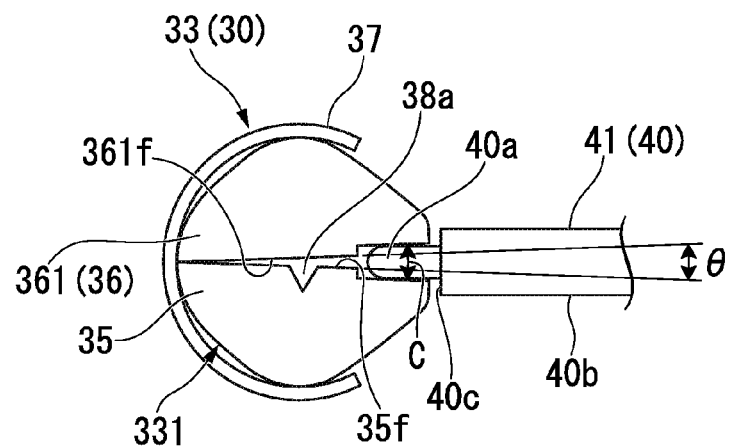
FIG. 4A is a view showing a state where an insertion member is interposed between elements in a section (a cross-section orthogonal to an extension direction of an aligning groove) structure of a clamp portion of the clamp portion-attached ferrule of FIG. 2.

As shown in FIG. 4A, the portion between the elements 35 and 36 of the clamp portion 33 of the optical connector 10 is slightly pushed and opened by a plate-shaped interposing member 40 which is interposed between the elements 35 and 36. As shown in FIGS. 1 and 2, the optical fiber 1 which is to be optically connected to the built-in optical fiber 32 can be inserted into or detached from a portion between the elements 35 and 36 slightly pushed and opened by the interposing member 40 from a rear side which is opposite to the ferrule side (front side) of the elements 35 and 36. Hereinafter, at this time, a state of the damp ports on 33 is referred to as an open state. In addition, the optical connector 10, in which the interposing member 40 is interposed between the pair of elements 35 and 36 of the clamp portion 33, is also referred to as an interposing member-attached optical connector.

The interposing member 40 functions as an opening means which enables the optical fiber 1 to Insert and detach with respect to a portion between the elements 35 and 36 by pushing and opening a portion between the elements 35 and 36 of the clamp portion 33.

Hereinafter, the optical fiber 1 which is optically connected to the built-in optical fiber 32 is also referred to as an insertion optical fiber.

The insertion optical fiber 1 is inserted into the portion between the elements 35 and 36 of the damn portion 33 in the open stale from the rear side of the clamp portion 33 to abut the tip of the insertion optical fiber 1 on the solid refractive index matching material 321 at the rear end of the matching material-attached optical fiber 320, and thereby, the insertion optical fiber can be optically connected to the matching material-attached optical fiber 320. The insertion optical fiber 1 which is abut on the tip of the solid refractive index matching material 321 of the rear end of the matching material-attached optical fiber 320 is optically connected to the built-in optical fiber 52 via the solid refractive index matching material 321.

As shown in FIGS. 2 and 4A, the optical connector 10 described here includes the interposing member 40 interposed between the elements 35 and 36 of the clamp portion 33. That is, the optical connector 10 is the interposing member-attached optical connector.

The interposing member 40 is inserted into the portion between the elements 35 and 36 of the clamp portion 33 by elasticity of the spring 37. Meanwhile, the interposing member 40 can manually be pulled out from the portion between the elements 35 and 36.

When, the tip of the insertion optical fiber 1 is abut on the solid refractive index matching material 321, the tip portion of an insertion optical fiber 1 and a rear end portion of the matching material-attached optical fiber 320 are disposed between the elements 35 and 36 of the clamp portion 33 of the clamp portion-attached ferrule 30.

The clamp portion 33 in an open state of the clamp portion-attached ferrule 30 holds and fixes the rear end portion of the matching material-attached optical fiber 320 and the tip portion of the insertion optical fiber 1 between the dements 35 and 36 by elasticity Of the spring 37 by removing the interposing member 40 while maintaining the state where the tip of the insertion optical fiber 1 is abut on the solid refractive index matching material 321. Consequently, the clamp portion 33 of the clamp portion-attached ferrule 30 maintains an optical connection state between the optical fibers 1 and 32.

The clamp portion-attached ferrule 30 functions as an optical fiber connector for optically connecting the optical fibers 1 and 32 to each other.

In addition, the optical connector 10 which accommodates the clamp portion-attached ferrule 30 in the housing 20 may be also treated as the optical fiber connector.

Figure 4B:
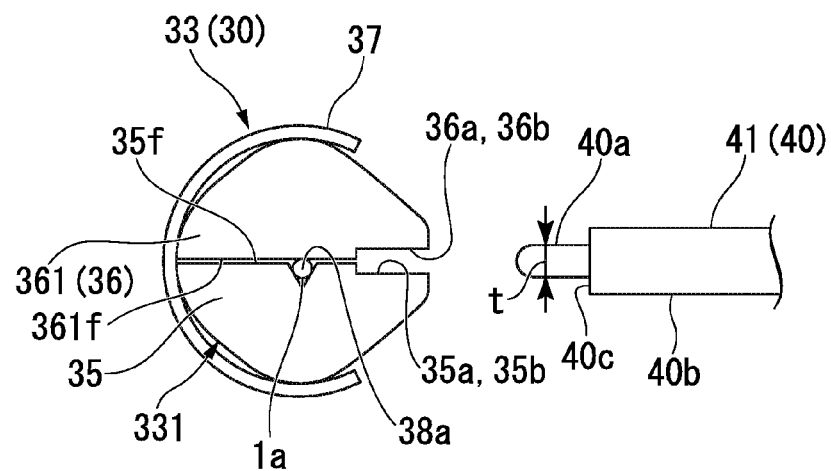
FIG. 4B is a view showing a state where the insertion member is pulled out from a portion between elements and an insertion optical fiber (more specifically, a bare optical fiber of the insertion optical fiber) is held and fixed between the elements in the section (the cross-section orthogonal to the extension direction of the aligning groove) structure of the clamp portion of the clamp portion-attached ferrule of FIG. 2.

The interposing member 40 shown in FIGS. 4A and 4B can be inserted into and detached from the portion between the elements 35 and 36 of the clamp portion 33.

The pressing element 3b of the clamp portion 33 of the clamp portion-attached ferrule 30 can be opened and closed by insertion and detachment of the interposing member 40 with respect to a portion between the base side element 35 and the pressing element 36.

For example, the ferrule 31 (ferrule main body) of the clamp portion-attached ferrule 30 shown in FIGS. 1 and 2 is a capillary shaped single-fiber ferrule formed of zirconia ceramics, glass, or the like. The fiber hole 31b of the ferrule 31 is a through-hole which penetrates the inside of the ferrule 31.

For example, as the ferrule 31, for example, a ferrule, which is used in a single-fiber optical connector, such as a SC type optical connector (a SC type optical connector (F04 type optical connection defined by JIS C 5973, SC: Single fiber Coupling optical fiber connector), a MU type optical connector (F14 type optical connector defined by JIS C 5973, MU; Miniature-Unit coupling optical fiber connector), or the like may be used.

As shown in FIGS. 1 and 3, the built-in optical fiber 32 (here, bare optical fiber) includes a from, end surface which is positioned at the joining end surface 31a for butt-joking on the front end of the ferrule 31. The front end surface of the built-in optical fiber 32 and the joking end surface 31a of the ferrule 31 are ground.

A portion of the built-in optical fiber 32 which is inwardly inserted into the fiber hole 31b is provided so as to be fixed to the ferrate 31 by adhesion of an adhesive agent, or the like.

The ferrule 31 functions as a fiber-fixing portion which fixes the built-in optical fiber 32 (first optical fiber) in the clamp portion-attached ferrule 30.

As shown in FIGS. 1 and 2, the pressing portion 36 of the clamp portion-attached ferrule 30 has a configuration in which a first element portion 361 and a second pressing element 362 which is positioned on a side (rear side) opposite to the ferrule 31 and a flange portion 34 with the first cover side element 361 therebetween. Hereinafter, the first cover side element 361 is also referred to as a front element, and the second cover side element 362 is also referred to as a rear element.

The pressing element (front dement 361 and rear element 362) functions as a pressing member which presses the optical fibers 1 and 32 inserted between the cover side element and the base side element 35 to the base side element 35 by elasticity of the spring 37.

A rear side extension portion 322 of the matching material-attached optical Fiber 320 is inserted between the base side element 35 of the clamp portion 33 and the front element 361. The rear end of the matching material-attached optical fiber 320 is positioned at a position corresponding to a center portion of the front element 361 in a front-rear direction (tight-left direction in FIGS. 1 and 3) of the clamp portion-attached ferrule 30.

The built-in optical fiber 32 is a short optical fiber which extends from the rear end of the built-in optical fiber 32 disposed between the base side element 35 and the front element 361 of the clamp portion 33 to the front end surface positioned on the joining end surface 31a of the ferrule 31.

The base side element 35 of the clamp portion 33 shown in FIGS. 1 to 3 is an extended portion which extends from a ring-shaped flange portion 34 outwardly inserted into and fixed to the rear end portion of the ferrule 31 to the rear side (right side in FIGS. 1 and 3).

The rear side extension portion 322 of the matching material-attached optical fiber 320 is accommodated in an aligning groove 38a, which is formed to extend in the front-rear direction of the clamp portion-attached ferrule 30, on an opposing surface 35f facing the pressing element 36 of the base side element 35. An accommodation state in the aligning groove 38a of the rear side extension portion 322 of the matching material-attached optical fiber 320 can be maintained by stiffness of the built-in optical fiber 32.

Figure 5A:
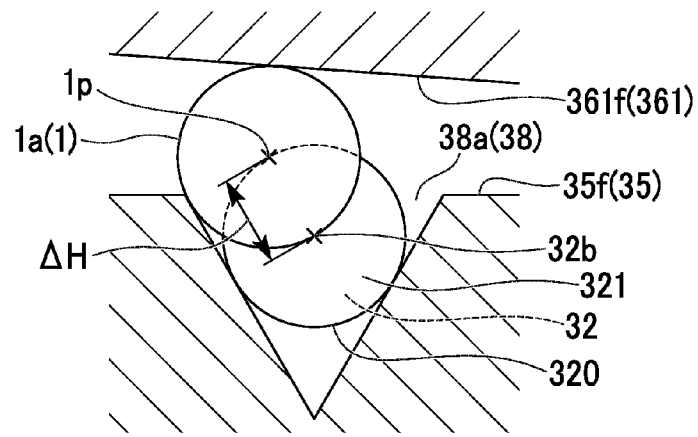
FIG. 5A is a view describing a relationship of a floating range of the second optical fiber, which is between the base side element (base member) of the clamp portion of the optical connector of FIG. 2 and the front element (pressing member), and an opening angle with respect to the base side element (base member) of the front element (pressing member).
Figure 5B:
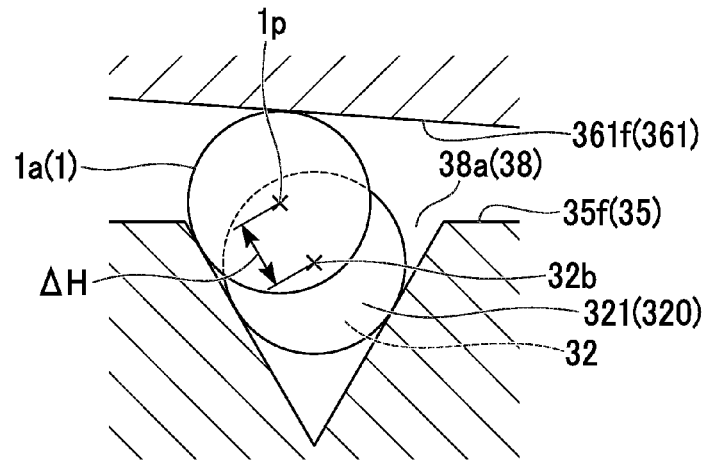
FIG. 5B is a view describing a relationship of a floating range of the second optical fiber, which is between the base side element (base member) of the clamp portion of the optical connector of FIG. 2 and the front element (pressing member), and an opening angle with respect to the base side element (base member) of the front element (pressing member).

As shown in FIGS. 5A to 5B, a portion of the built-in optical fiber 32 is accommodated In a sectional direction (hereinafter, also referred to as a cross-section direction), which is perpendicular to an optical axis of the built-in optical fiber 32, in the aligning groove 38a. A portion of the built-in optical fiber 32, which is not accommodated in the aligning groove 38a in the cross-sectional direction, protrudes from the base side element 35 to the front element 361 side.

As the insertion optical fiber 1, a coated optical fiber is employed, in which a resin coating material is coated (covered) on a hare optical fiber referred to as an optical fiber core wire or an optical fiber wire.

In a state where a coating of a tip portion of the insertion optical fiber 1 (coated optical fiber) is removed and a bare optical fiber 1a (hereinafter, referred to as an insertion side bare optical fiber) is exposed, the insertion optical fiber 1 is inserted from the rear side of the housing 20 (an end portion, opposite to the front side on which the joining end surface 31a of the ferrule 31 is positioned) into a portion between the elements 35 and 36 of the clamp portion 33 of the clamp portion-attached ferrule 30.

For example, as shown in FIG. 1, a tip (tip of the insertion side bare optical fiber 1a) of the insertion optical fiber 1 inserted into a portion between the elements 35 and 36 of the clamp portion 33 abuts on the solid refractive index matching material 321, thereby, the insertion optical fiber 1 inserted into a portion between the elements 35 and 36 of the clamp portion 33 is optically connected to the built-in optical fiber 32 via the solid refractive index matching material 321.

The optical connection with respect to the built-in optical fiber 32 of the insertion optical fiber 1 is particularly, the optical connection between the built-in optical fiber 32 and the insertion side bare optical fiber 1a.

The clamp portion 33 of the clamp portion-attached ferrule 30 holds and fixes the rear end portion of the matching material-attached optical fiber 320 and the tip portion of the insertion optical fiber 1 which is optically connected to the built-in optical fiber 32 between the elements 35 and 36 by elasticity of the spring 37. Accordingly, an optical connection state between the built-in optical fiber 32 and the insertion optical fiber 1 can be stably maintained. The rear end portion of the matching material-attached optical fiber 320 and the insertion side bare optical fiber 1a are held and fixed, between the base side element 35 and the front element 361.

The insertion side bare optical fiber 1a is inserted into the aligning groove 38a (refer to FIGS. 3, 4A, and 4B) of the base side element 35 by feeding the insert ion optical fiber 1 to the portion between the elements 35 and 36 from the rear side of the clamp portion 33. When the aligning groove 38a of the base side element 35 holds and fixes the rear end portion of the matching material-attached optical fiber 320 and the tip portion of the insertion optical fiber 1 which is optically connected to the built-in optical fiber 32 between the elements 35 and 36 by elasticity of the spring 37, the aligning groove 38a of the base side element 35 accurately positions and aligns the rear end portion of the matching material-attached optical fiber 320 and the insertion side bare optical fiber 1a so that the optical axis 1p (refer to FIG. 6) of the tip of the insertion side bare optical fiber 1a is accurately positioned at the optical axis 32b of the rear end of the built-in optical fiber 32.

The insertion side bare optical fiber 1a inserted into the aligning groove 38a is positioned by the aligning groove 38a so as to be butt-connected to the rear end of the rear-side extension portion 322 of the matching material-attached optical fiber 320.

The aligning groove 38a also has a role such as positioning and aligning the rear end of the rear side extension portion 322 of the matching material-attached optical fiber 320 and the tip of the insertion side bare optical fiber 1a so as to be butt-connected to each other.

Figure 6:
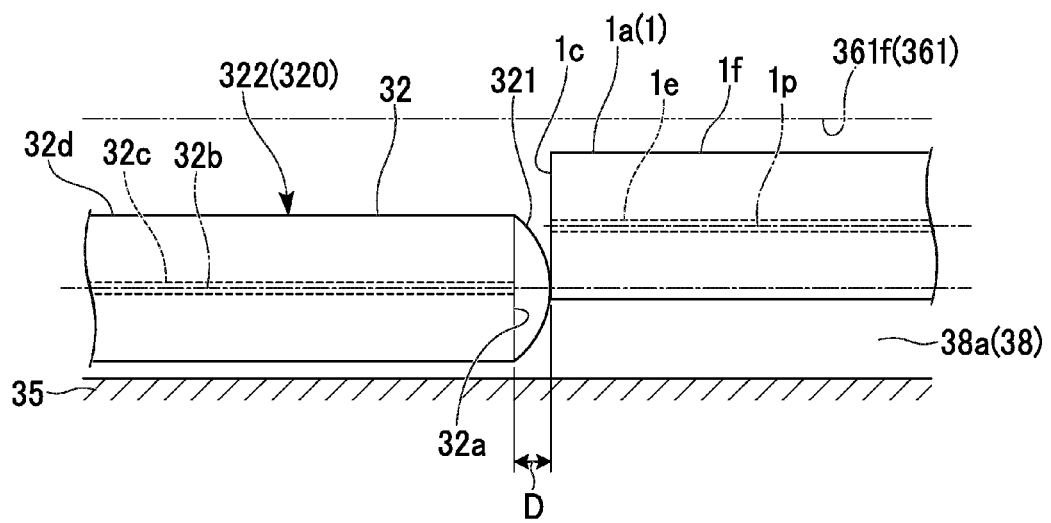
FIG. 6 is a view showing a structure in the vicinities of the base member (base side element) of the clamp portion-attached ferrule of FIG. 2 and the solid refractive index matching material.

The solid refractive index matching material 321 exemplified in FIGS. 3 and 6 is formed in a partially spherical shape to cover the entire rear end surface 32a of the built-in optical fiber.

In addition, the solid retractive index matching material 321 is formed in a layered shape which extends along the rear end surface 32a of the built-in optical fiber and covers the rear end surface 32a of the built-in optical fiber. An outer surface of the solid refractive index matching material 321 (surface except for a surface which contact with the rear end surface 32a of the built-in optical fiber) is formed in a partially spherical shape.

A virtual surface which is perpendicular to the optical axis 32b of the built-in optical fiber (hereinafter, also referred to as an optical axis of the rear end of the built-in optical fiber) at a rear end of the built-in optical fiber 32 (refer to FIGS. 6 and 7) is also referred to as a virtual vertical surface of the rear end of the built-in optical fiber 32. The rear end surface 32a of the built-in optical fiber perpendicular to the optical axis 32b of the rear end of the built-in optical fiber corresponds to a virtual vertical surface of the rear end of the built-in optical fiber 32 (virtual vertical surface of the tip of the first optical fiber).

Figure 7:
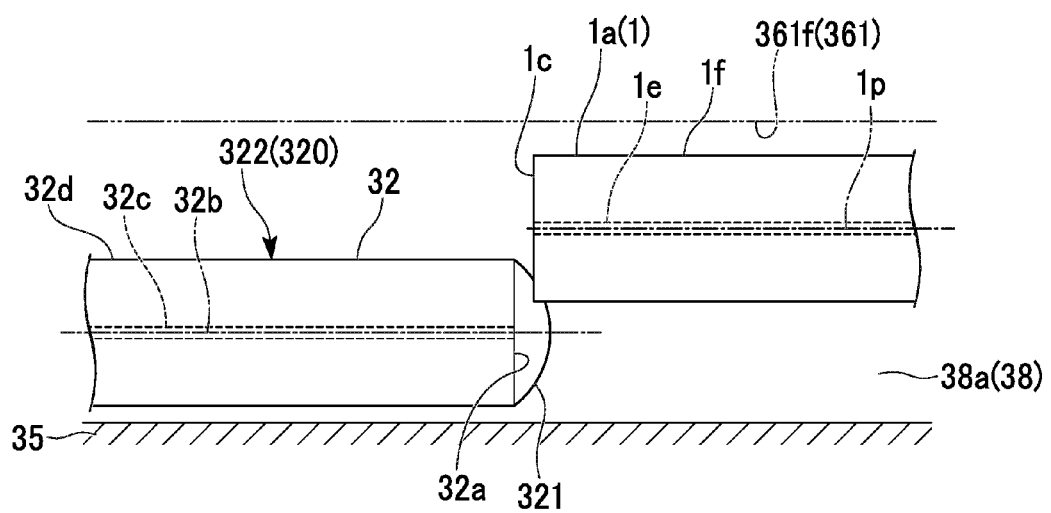
FIG. 7 is a view showing a structure in the vicinities of the base member (base side element) of the clamp portion-attached ferrule of FIG. 2 and the solid refractive Index matching material.

In FIGS. 6 and 7, an apex, at which a distance from the virtual vertical surface of the rear end of the built-in optical fiber 32 of the solid-refractive index matching material 321 is the maximum value, is positioned at a virtual extension line where a center of the rear end surface 32a of the built-in optical fiber (tip end surface of the first optical fiber) extended to a direction of the optical axis 32b of the rear end of the built-in optical fiber.

The distance from the virtual vertical surface of the rear end of the built-in optical fiber 32 to the apex of the solid refractive index matching material 321 is smaller than a curve radius of the outer surface of the solid refractive index matching material 321 having a partially spherical shape.

An allowable value of the deviation of the apex of the solid refractive index matching material 321 with respect to the virtual line of the optical axis 32b of the rear end of the built-in optical fiber (i.e., a separation distance In a vertical direction with respect to the virtual extension of the optical axis 32b of the rear end of the built-in optical fiber) is, for example, within a range of 10-20 μm in the first optical fiber (the built-in optical fiber 32) having a diameter of 125 μm.

The built-in optical fiber 32 and the insertion side bare optical fiber 1a shown in FIGS. 6 and 7 are single-mode optical fibers. The mode field diameter of the built-in optical fiber 32 is 1-15 μm. In FIGS. 6 and 7, an apex of the solid refractive index matching material 321 is positioned at a virtual extension portion which is extended from a core portion 32c (or a mode field) of the built-in optical, fiber 32 in the rear end surface 32a of the built-in optical fiber to a direction of an optical axis 32b of the rear end of the built-in optical fiber.

More specifically, the apex of the solid refractive index matching material 321 exemplified in FIGS. 3, 6, and 7 is accurately positioned and aligned at a virtual extension line of an optical axis 32b of the rear end of the built-in optical fiber.

In addition, In FIGS. 6 and 7, a reference numeral 32d indicates a clad portion of the built-in optical fiber 32 and a reference numeral if indicates a clad portion of the insertion side bare optical fiber 1a.

As the built-in optical fiber 32, an optical fiber other than a single-mode optical fiber can be employed. For example, when a multi-mode optical fiber is employed, as the built-in optical fiber 32, an apex of the solid refractive index matching material 321 is positioned at a virtual extension line which is extended from a center of the rear end surface 32a of the built-in optical fiber (i.e., the tip end surface of the first optical fibers to a direction of an optical axis of the rear end of the built-in optical fiber.

The solid refractive index matching material 321 is required to have a refractive index matching property. In this case, the refractive index matching property means a degree of proximity between a refractive index of a light-transmitting material for connection (the solid refractive Index matching material 321) and a refractive index of an optical fiber (the bare optical fiber of the insertion optical fiber 1 and the built-in optical fiber).

The refractive index of the solid refractive index matching material 321 is not particularly hunted as long as the retractive indexes are close to the refractive index of the optical fiber. However, preferably, considering transmission loss due to avoidance of Fresnel reflection, differences between the refractive indexes and the refractive Index of the optical fiber are within ±0.1, and more preferably, are with in ±0.05. In addition, when the refractive index of the bare optical fiber 1a of the insertion optical fiber 1 and the refractive index of the built-in optical fiber 32 are different from each other, preferably, a difference between an average value of the refractive indexes of the optical fibers and the refractive index of the solid refractive index matching material 321 is within the above-described range.

A method of providing the solid refractive index matching material 321 on the rear end surface 32a of the built-in optical fiber is not particularly limited.

For example, the solid refractive index matching material 321 may be a resin film in which a liquid polymer material is applied (printed, sprayed, electrostatically applied, or the like) to the rear end surface 32a of the built-in optical fiber and the coating film is solidified, a deposition film (resin film) which is formed by a Chemical Vapor Deposition (CVD) method or a Physical Vapor Deposition (PVD) method, or the like.

The layered solid refractive index matching material 321 may be configured by allowing a small piece cut into a size suitable for the rear end surface 32a of the built-in optical fiber from a base film (polymer film) to adhere to the rear end surface 32a of the built-in optical fiber. In order to provide the solid refractive index matching material 321 having a partially spherical shape to the rear end surface 32a of the built-in optical fiber, for example, a small piece having a partially spherical shape, which is cut from a base film in which a plurality of portions having partially spherical shapes are formed, may be also used.

In addition, applying a liquid polymer material to the rear ends surface 32a of the built-in optical fiber using electrostatic application or the like does not require precise positioning of a small piece cut from the base film with respect to the rear end surface 32a of the built-in optical fiber, and can form the solid refractive index matching material 321 having a partially spherical shape.

For example, a material of the solid refractive index matching material 321 may include polymer materials such as an acryl-based material, an epoxy-based material, a vinyl-based material, a silicone-based material, a rubber-based material, a urethane-based material, a methacryl-based material, a nylon-based material, a bisphenol-based material, a diol-based material, a polyimide-based material, a fluorinated epoxy-based material, a fluorinated acryl-based, or the like.

As the polymer film, adhesive materials configured of the polymer materials may be formed in film shapes so as to be used, and among the adhesive materials, considering circumstance resistance or adhesion properties, in general, a silicone-based adhesive material or an acryl-based adhesive material maybe suitably used.

The insertion side bare optical fiber 1a and the built-in optical fiber 32 are quartz-based optical fibers.

The solid refractive index matching material 321 is a soft layer in which hardness is considerably lower than hardness of the quartz-based optical fiber.

When the solid refractive index matching material 321 abuts on the tip of the bare optical fiber 1a of the insertion optical fiber 1, the solid refractive index matching material 321 functions as a cushion layer which relieves an impact force generated due to the abutment and prevents damage due to cracks between the rear end of the built-in optical fiber 32 and the tip of the insertion side bare optical fiber 1a, or the like.

Figure 9:
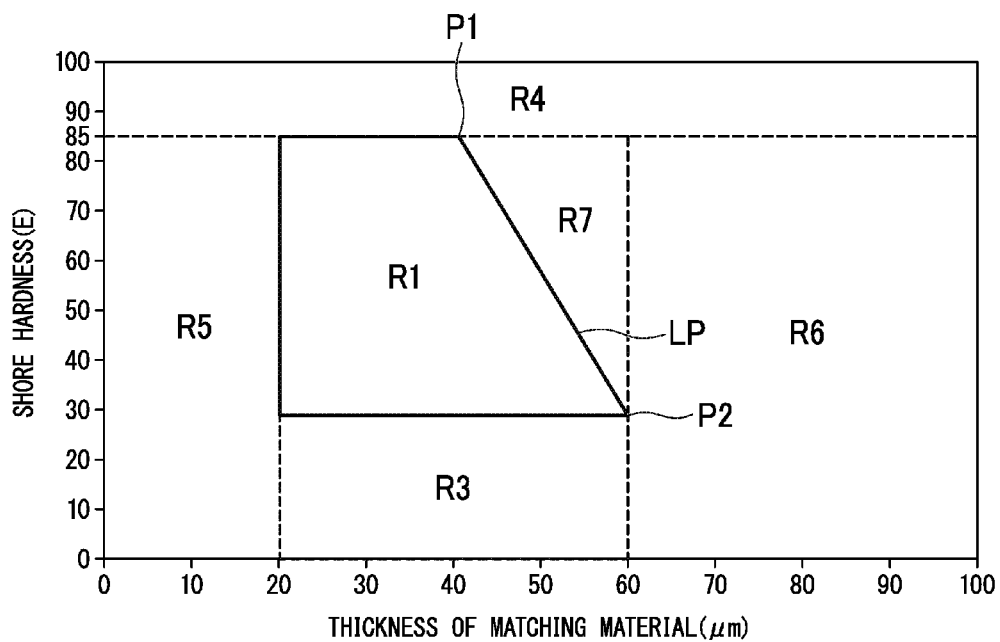
FIG. 9 is a diagram describing a preferred range of physical properties of the solid refractive index matching material used in one exemplary embodiment of the present invention.

As shown in FIG. 9, preferably. Shore hardness E (based on JIS K 6253) of the solid refractive index matching material 321 is 30 to 85 (30 or more and 85 or less).

When Shore hardness E of the solid refractive index matching material 321 is too low (for example, within a region R3 of FIG. 9), it is not possible to sufficiently obtain effects of relieving an impact force generated due to abutment between the solid refractive index matching material 321 and the tip of the insertion side bare optical fiber 1a. When Shore hardness E is 30 or more, it is possible to prevent an impact force.

For example, if Shore hardness E is 30 or more, even when a great force is applied to the solid refractive index matching material 321 due to positional adjustment between end portions of the optical fibers 2 and 22 in the aligning groove 19a or variation of a temperature or humidity, it is possible to sufficiently obtain effects of relieving an impact force generated due to abutment between the rear end surface 32a of the built-in optical fiber and the tip of the input-side bare optical fiber 1a, and it is possible to prevent damage due to cracks between the rear end of the built-in optical fiber 32 and the tip of the insertion side bare optical fiber 1a, or the like.

Moreover, when Shore hardness E of the solid refractive index matching material 321 is 30 or more, it is possible to prevent deformation such as wrinkle formation causing an increase of loss of the solid refractive index matching material 321.

If Shore hardness E of the solid refractive index matching, material 321 is too high (for example, a region R4), when there are irregularities on the tip surface 1c of the insertion side bare optical fiber 1a, follow-up deformation with respect to the tip surface 1c of the insertion side bare optical fiber is not sufficient, and a location which is separated from the mode field diameter portion on the tip surface 1c of the insertion side bare optical fiber is easily generated in the solid refractive index matching material 321.

When Shore hardness E of the solid refractive index matching material 321 is 85 or less, sufficient follow-up deformation with respect to the tip surface 1c of the insertion side bare optical fiber can be obtained, and a close contact with respect to the mode field diameter portion (including the core portion 1c on the tip surface 1c of the insertion side bare optical fiber) of the tip surface 1c of the insertion side bare optical fiber can be easily realized. In addition, in the solid refractive index matching material 321 having Shore hardness E of 85 or less, since the solid refractive index matching material 321 is deformed following the tip surface 1c of the insertion side bare optical fiber and comes into close contact with the tip surface 1c. even when a temperature or humidity is changed, the solid refractive index matching material 321 is not easily separated from the mode field diameter portion of the tip surface 1c of the insertion side bare optical fiber, and it is possible to maintain a close contact with respect to the mode field diameter portion of the tip surface 1c of the insertion side bare optical fiber.

Preferably, a thickness D of the so l id refractive index matching material 321 (having Shore hardness E of 30 to 85 based on JIS K 6253) (refer to FIG. 6) exceeds 10 μm. Preferably, the thickness D of the solid refractive index matching material 321 is 20 μm to 60 μm (20 μm or more and 60 μm or less).

More specifically, the thickness D of the solid refractive index matching material 321 is a dimension of a portion of the solid refractive index matching material 321 positioned on the extension of the optical, axis 32b of the built-in optical fiber 32 of the rear end surface 32a of the built-in optical fiber in the front-rear direction of the clamp portion-attached ferrule 30.

Moreover, the front-rear direction of the clamp portion-attached ferrule 30 is coincident with the optical ax is direction on the rear end surface 32a of the built-in optical fiber 32. In addition, in the clamp portion-attached ferrule 30 shown in FIG. 1 and the like, the direction of the clamp portion-attached ferrule 30 is coincident with the direction of the optical axis on the rear end surface 32 a of the built-in optical fiber 32. The thickness D of the solid refractive index matching material 321 indicates a thickness of the portion which covers the solid refractive index matching material 321 positioned on the extension of the optical, axis of the rear end surface 32a of the built-in optical fiber.

As shown in FIG. 9, if the solid refractive index matching material 321 is too thin (for example, in a region R5), it is not possible to sufficiently exert effects of relieving an impact force generated due to the abutment of the tip of the insertion side bare optical fiber 1a with respect to the rear end surface 32a of the built-in optical fiber. However, if the thickness D is 20 µm or more, it is possible to sufficiently exert a function as a cushion layer which relieves an impact force generated when the tip of the insertion side bare optical fiber 1a abuts on the rear end surface 32a of the built-in optical fiber.

In addition, since the thickness D is 20 µm or more, it is possible to sufficiently obtain follow-up deformation with respect to the tip surface 1c of the insertion side bare optical fiber, which is advantageous for a close contact with respect to the tip surface 1c of the insertion side bare optical fiber.

If the solid refractive index matching material 321 is too thick (for example, in a region R6 in FIG. 9), deformation of the solid refractive index matching material 321 which presses the tip of the insertion side bare optical fiber 1a increases, a portion or a direction, of the tip of the insertion side bare optical fiber 1a in a direction perpendicular to the optical axis of the rear end surface 32a of the built-in optical fiber is not easily stabilized, and alignment accuracy with respect to the rear end of the built-in optical fiber 32 is likely to decrease. In addition, if the solid refractive index matching material 321 is too thick, even after the tip of the insertion side bare optical fiber 1a is pressed to the solid refractive index matching material 321, a position (a position in the direction perpendicular to the optical axis of the rear end surface 32a of the built-in optical fiber), a direction, and alignment accuracy of the tip of the insertion side bare optical fiber 1a with respect to the rear end of the built-in optical fiber 32 are easily changed due to an external force such as vibration, a change of a temperature, or the like acting on the optical connector 10.

When the thickness D of the solid refractive index matching material 321 is 20 µm to 60 µm, it is possible to advantageously maintain stability of the position, the direction, and the alignment accuracy of the tip of the insertion side bare optical fiber 1a with respect to the rear end of the built-in optical fiber 32.

Stability of the position and the direction of the tip of the insertion side bare optical fiber 1a with respect to the rear end of the built-in optical fiber 32 are also influenced by the hardness of the solid refractive index matching material 321.

In FIG. 9, when a straight line which connects, a point P1 at which Shore hardness E is 85 and the thickness is 40 µm and a point P2 at which Shore hardness E is 30 and the thickness is 60 µm is defined as a straight, line LP, unlike a region (a region R7 or the like) in which the thickness is greater than that, of the straight line LP, in a region (region R1 or the like) which includes the straight line LP and in which the thickness is smaller than that of the straight line LP, de-stabilization of the position and the direction, of the tip of the insertion side bare optical fiber 1a with respect to the rear end of the built-in optical fiber 32 is not easily generated.

The solid refractive index matching material 321 can suitably use a matching material in which Shore hardness E is 30 to 85 and the thickness D is 20 µm to 60 µm and which has Shore hardness E and the thickness D of the region (region R1) except for the region R7 in FIG. 9. That is, in FIG. 9, the solid refractive index matching material 321 can suitably use matching materials within a range surrounded by (Shore hardness E; 30 and thickness: 20 µm) (Shore hardness E: 85 and thickness; 20 µm), (Shore hardness E; 85 and thickness; 40 µm), and (Shore hardness E; 30 and thickness; 60 µm).

As the insertion optical fiber 1 (particularly, as the insertion side bare optical fiber 1a), a holes-including optical fiber 1A (refer to FIG. 10) can be employed.

Figure 10:
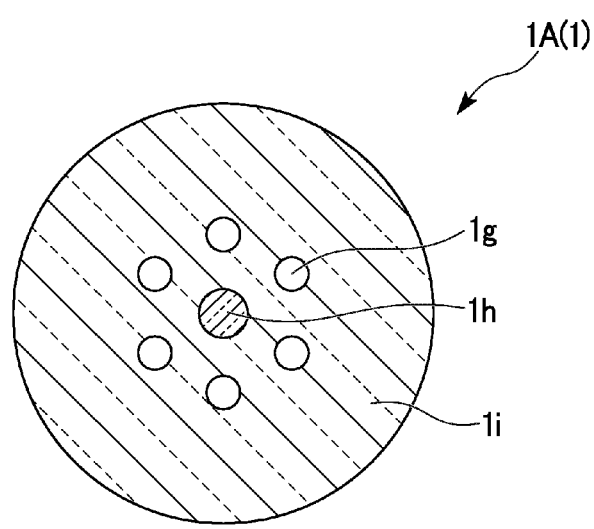
FIG. 10 is a cross-sectional view showing an example of a section (a section perpendicular to a longitudinal direction of a fiber) structure of a holes-including optical fiber which is used as a second optical fiber which is optically connected to a first optical fiber.

FIG. 10 shows an example of a sectional structure perpendicular to a longitudinal direction (optical axis direction) of the holes-including optical fiber 1A. As shown in FIG. 10, the holes-including optical fiber 1A is an optical fiber having a plurality of holes 1g which are continuous in a waveguide direction. As the holes-including optical fiber (Holey Fiber, HF), there is a hole assist fiber (Hole-Assisted Fiber HAF) or the like.

The holes-including optical fiber 1A shown In FIG. 10 includes a core portion 1b and a clad portion 1i surrounding the periphery of the core portion 1h, and the plurality of holes 1g are formed in the clad portion 1i. The plurality of holes 1g is uniformly disposed in the periphery of the core portion 1h.

As the rear end surface 32a of the built-in optical fiber, in addition to a flat surface perpendicular to the optical axis 32b of the rear end of the built-in optical fiber 32 shown in FIGS. 6 and 7, a surface subjected to Physical Contact (PC) grinding may be used. In addition, in the case of the rear end surface 32a of the built-in optical fiber subjected to PC grinding, use of the solid refractive index matching material 321 of the region R1 shown in FIG. 9 is suitable.

The base side element 35 of the clamp portion 33 of the clamp portion-attached ferrule 30 exemplified in FIGS. 1 to 4B is a plastic member or a metal member which is integrally formed with the flange portion 34. However, for example, the damp portion-attached ferrule 30 may use a configuration in which the plastic base side element 35 is integrated with the metal flange portion 34 using insert molding forming, adhesion-fixing, fitting-fixing, or the like.

As shown in FIGS. 1 and 2, the spring 37 has an elongated shape which has an extension direction as a longitudinal direction. The slit 37a is formed at a center portion of the spring 37 in a longitudinal direction (extension direction) shown in FIGS. 1 and 2. The spring 37 shown in FIGS. 1 and 2 includes a front spring portion 37b which is positioned at the front side (ferrule 31 side) of a slit 37a and a rear spring portion 37c which is positioned at the rear side of the slit 37a, which are separated by the slit 37a formed at a center portion in the longitudinal direction (extension direction).

As shown in FIG. 2, in the spring 37, a side opening portion 37d which extends over the entire length of the spring 37 in the longitudinal direction is formed. Two slits 37a are formed so as to extend along the circumferential direction of the spring 37 from both ends facing the side opening portion 37d of the spring 37 toward a portion (rear connection portion 37e) which is positioned on a side opposite to the side opening portion 37d via the element portion 331 positioned inside the spring 37. The front spring portion 37b and the rear spring portion 37c of the spring 37 are connected to each other via only the rear connection portion 37e which is secured between the two slits 37a, and function as springs independent from each other.

As shown in FIGS. 1 and 2, in the two elements (front element 361 and the rear element 362) configuring the cover side element 36, the entire rear element 362 is accommodated inside the rear spring portion 37c of the spring 37 and is collectively held with the rear end portion of the base side element 35 by elasticity of the rear spring portion 37c. Meanwhile, the front element 361 is accommodated inside the front spring portion 37b and the rear spring portion 37c of the spring 37, and is collectively held with the base side element 35 by elasticity of the spring 37.

As the clamp portion 33, a configuration can he employed such that a boundary portion of the front element and the rear element is positioned at the slit 37a of the spring 37 and the front element is accommodated inside the front spring portion 37b only.

As shown in FIGS. 1 and 2, hereinafter, a portion which is coated by a coating material of the insertion optical fiber 1 is referred to as a coating portion 1b.

As shown in FIGS. 1 and 3, a fiber-positioning groove 38, which includes the above-described aligning groove 38a and a coating portion-accommodating groove 38b which accommodates the coating portion 1b of the insertion optical fiber 1 and positions the coating portion 1b, is formed on the opposing surface 35f of the base side element 35, The aligning groove 38a is formed on a portion of the opposing surface 35f of the base side element 35 feeing the front element 361. The coating portion-accommodating groove 38b is formed so as to extend rearward from the rear end of the aligning groove 38a.

The insertion optical fiber 1 is fed from the rear end opening portion of the housing 20 and can be inserted into the fiber-positioning groove 38. According to this feeding, the insertion side bare optical fiber 1a which has been led out from the insertion optical fiber 1 in advance can be inserted into the aligning groove 38a.

The aligning groove 38a is formed so as to extend along the extension direction (longitudinal direction) from the front end of the base side element 35 (the left end of the base side element 35 in FIG. 3) so as to be continuous to the fiber hole 31b penetrating the ferrule 31. The rear side extension portion 322 of the matching material-attached optical fiber 320 is accommodated in the aligning groove 38a. The rear end (solid refractive index matching material 321) of the matching material-attached, optical fiber 320 is disposed at a center portion tin the shown example, a position which is slightly deviated toward the from side (ferrule 31 side) from the center in the longitudinal direction) in the longitudinal direction of the aligning groove 38a.

The coating portion-accommodating groove 38b is formed, so as to extend from the rear end (an end portion opposite to the front end of the ferrule 31 side) of the aligning groove 38a to the rear end of the base stele element 35 along the extension direction of the base side element 35.

As shown in FIGS. 4A and 4B, the aligning groove 38a of the shown example is formed as a V groove. However, the present invention is pot limited to this, and the aligning groove 38a may be formed as a round groove (a semi-circular sectional groove), a U groove, or the like.

As shown in FIG. 3, a width and a depth of the coating portion-accommodating groove 38b are greater than those of the aligning groove 38a in order to accommodate and position the coating portion 1b which is thicker than the bare optical fiber 1a of the insertion optical fiber 1.

As shown in FIGS. 1 and 3, the clamp portion 33 of the optical connector 10 of the shown example has a configuration in which the coating portion-accommodating groove 38c is formed on an opposing surface 362f of the rear element 362. The coating portion-accommodating groove 38c formed on the opposing surface 362f of the rear element 362 is formed at a position corresponding to the coating portion-accommodating groove 38b of the base side element 35.

Front end portions of the coating portion-accommodating grooves 38b aid 38c are formed in a taper shape.

Front end portions of the coating portion-accommodating grooves 38b and 38c have a function that the tip of the insertion optical fiber 1 (the tip of the insertion side bare optical fiber 1a) inserted into the fiber-positioning groove 38 from the rear side of the clamp portion 33 can be smoothly introduced into the aligning groove 38a.

As shown to FIG. 3, the rear end portions 38b2 and 38c2 of the respective coating portion-accommodating grooves 38b and 38c are formed in a taper shape where a width and a depth of the grooves become large from the rear end toward the rear side of the respective main groove portions 38b1 and 38c1 between the front end portion and the rear end portion of the respective coating portion-accommodating grooves 38b and 38c.

The rear end portions 38b2 and 38c2 of the respective coating portion-accommodating grooves 38b and 38c are formed into a tapered-shaped opening portion opened in a rear end of the element portion 331.

In the coating portion-accommodating groove 38b and 38c, it is a main groove portion that accommodates and positions the coating portion 1b of the insertion optical fiber.

Front end portions of the respective coating portion-accommodating grooves 38b and 38c are formed in a taper shape where a width and a depth of the grooves become small from the front end toward the front side of the main groove portion.

In addition, as the clamp portion, a configuration in which the coating portion-accommodating groove is formed on one or both of the opposing surface of the base side element 35 and the opposing surface of the rear element 362 may be used. The coating portion-accommodating grooves 38b and 38c of the elements 35 and 352 of the clamp portion are formed so as to open to the rear end of the clamp portion 33. The coating portion-accommodating grooves 38b and 38c are formed in V grooves. However, the present invention is not limited to this, and the coating portion-accommodating grooves 38b and 38c may be formed as round grooves (semi-circular sectional grooves), U grooves, angled grooves, or the like.

As shown in FIG. 4A, a portion between the pair of elements 35 and 36 (base side element 35 and cover side element 36) of the clamp portion 33 of the optical connector 10 is slightly pushed and opened by a plate-shaped interposing member 40 which is interposed between the elements 35 and 36, and the led-out bare optical fiber 1a and the coating portion 1b of the insertion optical fiber 1 can be inserted (pushed) from the rear side of the clamp portion 33 into the fiber-positioning groove 38. Hereinafter, at this time, a state of the clamp portion 33 is referred to as an open state. In addition, the optical connector 10, in which the interposing member 40 is interposed between the pair of elements 35 and 36 of the clamp portion 33, is also referred, to as an interposing member-attached optical connector.

As shown in FIGS. 2 and 4A, the interposing member 40 interposed between the pair of elements 35 and 36 (the base side dement 35 and the pressing element 36) of the clamp portion 33 of the optical connector 10 functions of maintaining an open state between the pair of elements 35 and 36 against elasticity of the spring 35 of the clamp portion 33. The interposing member 40 interposed between the pair of elements 35 and 36 of the clamp portion 33 is held between the elements 35 and 36 of the clamp portion 33 by elasticity of the spring 37 of the clamp portion 33.

Hereinafter, as shown in FIGS. 4A and 4B, in a cross-section perpendicular to the front-rear direction of the clamp portion 33, a side of the side opening portion 37d of the spring 37 is referred to as an opening side (right side in FIGS. 4A and 4B) and m opposite side of the opening side is referred to as a back side. In addition, a forward-backward direction toward the back side when viewed from the opening side, that is, a right-left direction in FIGS. 4A and 4B is referred to as a depth direction.

The elements 35 and 36 of the clamp portion 33 are arranged in the vertical direction of the clamping portion 33 so as to hold the optical fiber arranged, between the element 35 and 36 from both sides of the vertical direction perpendicular to the depth direction in the cross section of the clamping portions 33.

As shown in FIG. 4A, the interposing member 40 is inserted so as to be interposed between the elements 35 and 36 from the side of the opening portion of the clamp portion 33. In addition, the interposing member 40 is inserted into an interposing member insertion hole (not shown) penetrating the thick portion of the sleeve-shaped housing 20 (refer to FIG. 1) of the optical connector 10, and a tip portion 40a (refer to FIG. 4A) of the interposing member 40 is interposed between the pair of elements 35 and 36 of the damp portion 33.

As shown in FIGS. 4A and 4B, in a depth direction of the clamp portion 33 since the interposing member 40 is inserted into a portion between the pair of elements 35 and 36 of the clamp portion 33 with an insertion depth which does not reach the fiber-positioning groove 38 of the element 35, the interposing member 40 does not interfere with work of inserting the insertion optical fiber 1 into the fiber-positioning groove 38.

As shown in FIG. 2, the interposing members 40 are inserted into each of a portion between the front element 361 and the base side element 35 and a portion between the rear element 362 and the base side element 35 according to two elements (front element 361 and the rear element 362) of the cover side element 36. That is, a total of two interposing members 40 are interposed between the pair of elements 35 and 36 of the clamp portion 33 at positions different from each other in the front-rear direction (the right-left direction in FIG. 1) of the clamp portion-attached ferrule 30 according to two elements 361 and 362 of the cover side element 36.

In FIG. 2, reference, numeral 41 is assigned to the interposing member 40 which is interposed between the front element 361 and the base side element 35, and reference numeral 42 is assigned to the interposing member 40 which is interposed between the rear element 362 and the base side element 35.

As shown in FIGS. 2, 4A and 4B, interposition recesses 35a and 36a, into which the tip portion 40a of the interposing member 40 is detachably inserted, are formed on the elements 35 and 36 of the clamp portion 33 of the clamp portion-attached ferrule. The interposition recesses 35a and 36a are fanned so as to be recessed from the opposing surfaces of the elements 35 and 36 at mutually corresponding positions of the opposing surface 361f of the front clement 361 and the opposing surface 35f of the base side dement 35. and mutually corresponding positions of the opposing surface 362f of the rear element 362 and the opposing surface 35f of the base side element 35. The pairs of interposition, recesses '35a and 36a which are formed at mutually corresponding positions of the opposing surfaces of the elements 35 and 36 are formed on the element portion 331 of the clamp portion 33 of the clamp portion-attached ferrule 30 at two locations in the front-rear direction of the clamp portion-attached ferrule 30.

As shown, in FIGS. 2, 4A, and 4B, each of the interposition recesses 35a and 36a is formed so as to extend from the side surfaces (hereinafter-referred to as the side surface of the opening side) of the elements 35 and 36 facing the side opening portion 37d. of the spring 37 toward the fiber-positioning groove 38. The interposition recesses 35a and 36a are formed at an end portion at the opening side of the clamp portion 33 of the opposing surfaces 35f 361f, and 362f of the respective elements 35 and 36. In addition, the interposition recesses 35a and 36a are formed so as to be opened at the side surface of the opening side of each of the elements 35 and 36.

Each of the two interposing members 41 and 42 is detachably inserted into a portion between the pair of the interposition recesses 35a and 36a at mutually corresponding positions of the opposing surfaces of the elements 35 and 36.

In the base side element 35 of the clamp portion 33 shown in FIGS. 3, 4A and 4B, a direction perpendicular to an extension direction of the aligning groove 38a on the opposing surface 35f thereof is referred to as a width direction (vertical direction in FIG. 3). In addition, in the pressing elements 361 and 362, a direction perpendicular to an extension direction of the aligning groove 38a on the opposing surfaces 361f and 362f thereof is referred to as a width direction (vertical direction in FIG. 3).

The elements 35 and 36 of the clamp portion 33 are accommodated inside the spring 37 such that one end in the width direction thereof is arranged at a side of the opening of the clamp portion 33 and the other end in the width direction thereof is arranged so as to face a depth side of the clamp portion 33.

The fiber-positioning groove 38 is formed so as to extend in the front-rear direction of the clamp portion-attached ferrule 30 at a center portion of the width direction of the base side element 35.

In the interposition recesses 35a of the base side element 35, an extension dimension from an opening side to an inner side of the clamp portion 33 in a width direction of the base side element 35 is set so that the fiber-positioning groove 38 does not reach the fiber-positioning groove 38. The interposition recesses 36a of the pressing elements 361 and 362 is formed so as to extend from a location which is opposite to an end portion at the Inner side of the clamp portion of the interposition recesses 35a of the base side element 35 to the opening side thereof.

The interposing member 40 includes a portion protruding outside the housing 20 (refer to FIG. 1) on a base end side opposite to the tip portion 40a, and this portion can function as a pull-out operation portion for extracting the interposing member 40 from the optical connector 10.

A portion between the elements 35 and 36 of the clamp portion 33 can be opened and closed by insert ion and detachment of the interposing member 40 with respect to a portion between the elements 35 and 36 (specifically, insertion and detachment of the interposing member 40 with respect to a portion between the pair of the interposition recesses 35a and 36a).

The interposing member 40 may have any configuration as long as it can maintain an open state between the pair of elements 35 and 36 against elasticity of the spring 35 of the clamp portion 33 and can be operated so as to he pulled out from the portion between the pair of elements 35 and 36. The shape of the interposing member 40 is not limited to the plate shape, and for example, the interposing member 40 maybe formed m a soft sheet shape or a rod shape.

The optical connector 10 is a field assembly optical connector.

In order to attach (assemble) the optical connector 10 to the tip portion of the insertion optical fiber 1, as shown in FIGS. 2 and 4A, the clamp portion 33 is brought into an open state (that is, a state of the interposing member-attached optical connector) by the interposing member 40 interposed between the elements 35 and 36. In addition, the insertion optical fiber 1 having the fed-out bare optical fiber 1a is fed into the fiber-positioning groove 38 of the element portion 331 of the clamp portion 33 from the rear end opening portion of the housing 20, and the insertion side bare optical fiber 1a is inserted into the aligning groove 38a. Thereby, the tip of the insertion side bare optical fiber 1a is butted to the solid refractive index matching material 321 of the rear end of the matching material-attached optical fiber 320. Next, in a state where a state where the tip of the insertion side bare optical fiber 1a butts against the solid refractive index matching material 321 being maintained, all interposing members 40 interposed between the elements 35 and 36 of the clamp portion 33 are entirely removed (refer to FIG. 4B).

Accordingly, the portion inserted into the fiber-positioning groove 38 of the insertion optical fiber 1 and the rear side extension portion 322 of the matching material-attached optical fiber 320 are optically connected to each other, and an optical fiber connection structure is obtained, in which the portion inserted into the fiber-positioning groove 38 and the rear side extension portion 322 are held and fixed between the elements 35 and 36 of the clamp portion 33 by elasticity of the spring 35 of the clamp portion 33. In addition, as a result, since extraction of the insertion optical fiber 1 from the clamp portion 33 is restricted, it is possible to attach (assemble) the optical connector 10 to the tip portion of the insertion optical fiber 1.

In the clamp portion 33, hereinafter, the state where the portion of the insertion optical fiber 1. inserted into the fiber-positioning groove 38 and the rear side extension portion 322 of the matching material-attached optical fiber 320 are held and fixed between the pair of elements 35 and 36 is referred to as a fiber-holding state.

After a coating of the tip portion of the insertion optical fiber 1 is removed (the bare optical fiber 1a is led out) and cutting is performed on site, the insertion optical fiber 1 is inserted into the fiber-positioning groove 38.

A lead-Out length L (refer to FIG. 1) of the bare optical fiber 1a of the insertion optical fiber 1 is ensured so that the bare optical fiber 1a is accommodated in the aligning groove 38a of the fiber-positioning groove 38 and the coating portion 1b is accommodated in the coating portion-accommodating grooves 38b and 38c of the element 331 when the insertion optical fiber 1 is fed into the fiber-positioning groove 38 by a length necessary for abutting the bare optical fiber 1a on the solid refractive index matching material 321 at the tear end of the matching material-attached optical fiber 320. Accordingly, when the interposing member 40 is pulled out from the clamp portion 33 and the clamp portion 33 enters the fiber-holding state after abutting the solid refractive index matching material 321 at the rear end of the matching material-attached optical fiber 320. the insertion side bare optical fiber 1a is held and fixed between front element 361 and the base side element 35 along with the rear side extension portion 322 of the matching material-attached optical fiber 320, and the insertion optical fiber coating portion 1b is held and fixed between the rear element 362 and the base side element 35.

A portion facing the aligning groove 38a of the opposing surface of the pressing clement 36 (here, the opposing surface 361f of the front clement 361, refer to FIG. 3) facing the opposing surface 351, of the base side element 35 is a flat surface having high flatness. When the interposing member 40 Is removed from, the damp portion 33 in an open state, the insertion side bare optical fiber 1a and the rear side extension portion 322 of the matching material-attached optical fiber 320 are pressed to the aligning groove 38a by elasticity of the spring 35 of the clamp portion 33, and are 'accurately' positioned (aligned) by the aligning groove 38a. As a result, in the state where the insertion side bare optical fiber 1a and the rear side extension portion 322 of the matching material-attached optical fiber 320 are optically connected to each other, the insertion side bare optical fiber 1a and the rear side extension, portion 322 of the matching material-attached optical fiber 320 are held and fixed between the front element 361 and the base side element 35.

The insertion optical fiber 1 uses an optical fiber in which an outer diameter of the bare optical fiber 1a is the same as an outer diameter of the built-in optical fiber 32.

In addition, tor example, when a chamfered portion is formed between the rear end surface 32a of the built-in optical fiber 32 and the side-surface (circumferential surface) of the built-in optical fiber 32, the solid refractive index matching material 321 of the matching material-attached optical fiber 320 may be also provided on the chamfered portion in addition to the rear end surface 32a of the built-in optical fiber. However, the solid refractive index matching material 321 is not provided on the side surface of the built-in optical fiber 32. In addition, an installation range of the solid refractive index matching material 321 provided on the rear side of the side surface of the built-in optical fiber 32 is limited to within a range of a virtual extension of the side surface of the built-in optical fiber 32.

In the tip surface 1c of the insertion side bare optical fiber 1a, irregularities may exist other than a flat surface which is perpendicular to the optical axis 1p of the insertion side bare optical fiber 1a (refer to FIG. 6).

As shown in FIG. 1, in a configuration that the tip of the insertion side bare optical fibers 1a is abut on the solid refractive index, matching material 321 to optically connect the built-in optical fiber 32, even when the lip surface 1c of the insertion side bare optical fibers 1a includes irregularities, it is possible to realize an optical connection having low loss due to close contact of the solid refractive index matching material 321 and a tip surface 1c of the insertion side bare optical fiber 1a.

The solid refractive index matching material 321 is filled in without space between a mold field portion of the rear end surface 32a of the built-in optical fiber and a mode field portion of the tip surface 1c of the insertion side bare optical fiber.

As shown in FIGS. 4A and 46, when the insertion and removal of the interposing member 40 between the pressing elements 361 and 362 and the base-side element 35, the pressing elements 361 and 362 of the clamping portion 33 is opened and closed by a rotation around the end portion at the depth side of the clamping portion 33 (hereinafter, referred to as depth-side end portion) with respect to the base side dement 35.

When a tip at the depth side of the pressing dements 361 and 362 directly contact with a tip at the depth side of the base side element 35, the pressing elements 361 and 362 is rotatable around a rotation-axis line, which extend in the rear-end direction of the clamp portion-attached ferrate 30, with respect to the base side element 35.

As shown in FIGS. 4A and 48, in a state that the interposing member 40 is inserted between the elements 35 and 36 of the clamp portion 33, a dimension in a direction perpendicular to the depth direction of the clamp portion 33 and the front-rear direction of the clamp portion-attached ferrule 30 is hereinafter also referred to as the thickness dimension.

In the plate-shaped interposing member 40, a thickness dimension is a dimension in a thickness direction (dimension in vertical direction in FIG. 4A) of the member 40.

In addition, in the interposing member 41 interposed between the front element 361 and the base side element 35, reference symbol t is assigned to the thickness dimension of the lip portion 40a which is to be inserted between the elements 35 and 36 of the damp portion 33 (refer to FIG. 4B).

The interposing member 40 shown in FIGS. 4A and 4B includes a base portion 40b in which a thickness dimension thereof is greater than a thickness dimension of the tip portion 40a on a base end side of the tip portion 40a which is to be inserted between the elements 35 and 36 of the clamp portion 33. The interposing member 40 can he inserted between the elements 35 and 36 to a position where a step surface 40c which is arranged at a boundary of the tip portion 40a and the base portion 40b comes into contact with the element portion 331 (i.e., an insertion limit position).

An angle θ in FIG. 4A shows an opening angle of the front element 361 with respect to the base side element 35 when depth-side end portions at the clamp portion 33 of the respective front element 361 and base side element 35 are in contact with each other and the front element lacing surface 361f is inclined with respect to the opposing surface 35f of the base side element. The opening angle θ particularly refers to an opening angle of the front element facing surface 361f with respect so the opposing surface 35f of the base side element.

In the clamp portion 33 in the open state, an opening angle of the pressing element 361 and 362 with respect to the base side element 35 (particularly, an opening angle of the opposing surfaces 361f and 362f of the pressing dements with respect to the opposing surface 35f of the base side element) can vary by a selection of the thickness dimension t of the tip portion 40a of the interposing member. The opening angle varies by an insertion depth of the tip portion 40a of the interposing member in the depth direction of the clamp portion 33.

As shown in FIG. 4B, when the interposing member 40 does not present and the built-in optical fiber 32 is held between the front element 361 and the base side element 35, the front element 361 is tiltable with respect to the base side element 35 by a rotation around the built-in optical fiber 32. FIG. 48 shows a state that the front element facing surface 361f is parallel to the opposing surface 35f of the base side element. However, the front element 361 can adapt a state where in the width direction thereof, the depth-side end portion of the clamp portion 33 is abut on the depth-side end portion of the base side element 35, the opposing surface 361f is abut on the built-in optical fiber 32, and the opposing surface 361f is inclined with respect to the opposing surface 351 of the base side element. Such state of the front element 361 is also referred to as an inclined holding state.

As shown in FIGS. 4A and 4B, the bottom surface 35b of the interposition recess 35a of the base side element 35 is formed parallel to the opposing surface 35f of the base side element 35. The bottom surface 36b of the interposition recess 36a of the front clement 361 is formed parallel to the opposing surface 36 if of the front element 361.

The bottom surface 36b of the interposition recess 36a of the front element 361 in the inclined holding state is inclined with respect to the bottom surface 35b of the interposition recess 35a of the base side element 35 at the same angle as the opening angle θ with respect to the opposing surface 35f of the base side element of the opposing surface 361f of the front element.

The front element 361 can be in the inclined holding state described above even when the built-in optical fiber 32 and the insertion side bare optical fiber 1a are held between the base side element 35 and the front element 361.

in the elements 35 and 361, hereinafter, a region that is in contact with the tip portion 40a of the interposing member 41 to be inserted into and detached from a portion between the elements 35 and 361 is also referred to as an interposing-member contact region. The interposing-member contact region is at an area where the elements 35 and 361 face each other.

In particular, the interposing-member contact regions of the elements 35 and 361 in the clamp portion 33 of the present embodiment are respectively secured at the bottom surface 36b of the interposition recess of the front element 361 in the inclined holding state and the bottom surface 35b of the interposition recess of the base side element 35.

A thickness t of the tip portion 40a of the interposing member 41 interposed between the front element 361 and the base side element 35 is set greater than a minimum value of a distance between a contact region of the interposing member of the front element 361 in the inclined holding state and a contact region of the interposing member of the base side element 35.

The thickness t of the tip portion 40a of the interposing member 41 in the present embodiment is set greater than a minimum value of a distance between a contact region where the bottom surface 36b of the interposition recess of the front element 361 in the inclined holding state contacts the interposition recess and a contact region where the bottom surface 35b of the interposition recess of the base side element 35 contacts the interposing member.

As the clamp portion 33, it is not limited to the configuration in which an interposition recess is formed both in the elements 35 and 36, and a configuration can be employed such that an interposition recess is not formed in both of the elements 35 and 36 or an interposition recess is present only one of the elements 35 and 36.

As shown in FIG. 4A, a separation distance C between the front element 361 and the base side element 35 when the depth-side end portion of the clamping portion 33 in the width direction of the front element 361 abuts on the depth-side end portion of the base side element 35 and the opposing surface 361f of the front element is inclined toward the opposing surface 35f of the base side element refers to a separation distance between the front element 361 and the base-side element 35 in the direction perpendicular to a virtual intermediate plane (and a virtual extension thereof) which is at an intermediate between the opposing surface 361f of the front element and the opposing surface 35f of the base-side element.

The distance between the interposing-member contact region at the bottom surface 36b of the interposition recess of the front element 361 in the inclined holding state and the interposing-member contact region at the bottom surface 35b of the interposition recess of the base side element 35 also corresponds to the distance C between the opposing surface 361f of the front element 361 and the opposing surface 35f of the base side element 35.

As shown in FIGS. 4A and 6, the insertion side bare optical fibers 1a which is inserted between the elements 35 and 36 of the clamping portion 33 in the open state is movably disposed between elements 35 and 36.

In the clamp portion 33, a state in which the interposing member 41 is inserted to the insertion limit position with respect to the front element 361 and the base side element 35 is hereinafter also referred to as the maximum open state. The opening angle θ of the front element 361 of the clamp portion 33 in the maximum open state with respect to the base side element 35 is set so as to be able to regulate the felling off of the insertion side bare optical fiber 1a from a portion between an inner surface of the aligning groove 38a and the front element 361 (particularly, the opposing surface 361f) and to allow the free movement of the insertion side bare optical fiber 1a between the elements 35 and 361. However, the clamp portion 33 of the maximum opening state of the optical connector 10 of the present embodiment has a configuration such that an allowable displacement amount of the tip of the insertion side bare optical fiber 1a, which is between the front element 361 and the base side element 35, in a vertical direction with respect to the virtual extension of tin optical axis 32b of the rear end of the built-in optical fiber is limited to 50% or less of the diameter of the built-in optical fiber 32 (i.e., cladding diameter).

Figure 5C:
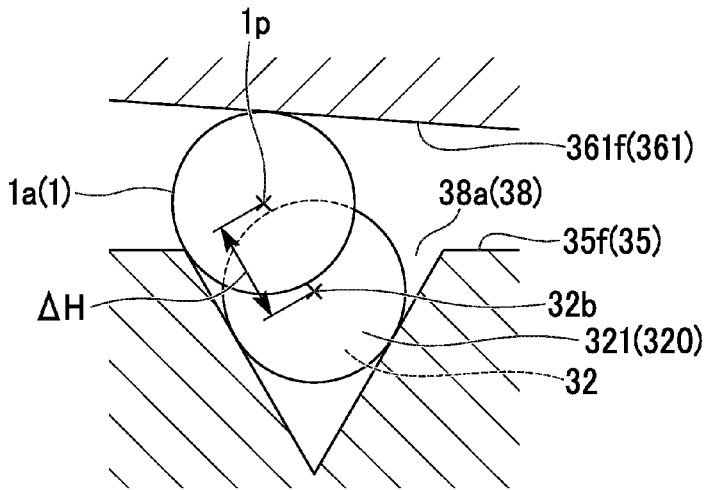
FIG. 5C is a view describing a relationship of a floating range of the second optical fiber, which is between the base side clement (base member) of the clamp portion of the optical connector of FIG. 2 and the front element (pressing member), and an opening angle with respect to the base side element (base member) of the front element (pressing member).

As shown in FIGS. 5A-5C, an allowable displacement amount of the tip of the insertion side bare optical fiber 1a, which is inserted between the front element 361 of the clamp portion 33 in the open state and the base side element 35, in the direction perpendicular to the virtual extension of an optical axis 32b of the rear end of the built-in optical fiber is also referred to as an allowable displacement amount ΔH. In FIGS. 5A-5C, the allowable displacement amount ΔH is particularly, deviation allowance (i.e., axis deviation allowance) of an optical axis 1p of the tip of the insertion side bare optical fiber 1a in a direction perpendicular to the virtual extension of the optical axis 32b of the rear end of the built-in optical fiber.

As shown in FIGS. 5A and 5C, in the damping portion 33 of the optical connector 10 of the present embodiment, at the maximum open state, the insertion side bare optical fiber 1a inserted between the front element 361 and the base side element 35 is allowed to move freely with the allowable displacement amount (axis deviation allowance) ΔH of 50% or less of the diameter of the built-in optical fiber 32.

In other words, the clamp portion-attached ferrule 30 of the optical connector 10 which is the interposing member-attached optical connector has a configuration such that the allowable displacement amount (axis deviation allowance) ΔH of the tip of the insertion side bare optical fiber 1a between the front element 361 and the base side element 35 is limited to 50% or less of the diameter of the built-in optical fiber 32.

FIG. 5A shows a stale in which the allowable displacement amount (axis deviation allowance) ΔH of the tip of the insertion side bare optical fiber 1a between the front element 361 and the base side element 35 is set to be 50% of the diameter of the built-in optical fiber 32. FIG. 5C shows a state in which the allowable displacement amount (axis deviation allowance) ΔH of the tip of the Insertion side bare optical fiber 1a is set to be less than 50% of the diameter of the built-in optical fiber 32.

FIG. 5B is a view describing a comparative example.

When the allowable displacement amount (axis deviation allowance) ΔH of the up of the insertion side hare optical fiber 1a is too large compared to the diameter of the built-in optical fiber 32 (refer to FIG. 5B), as shown in FIG. 7, there is a possibility that an edge portion on an outer circumference of the tip surface 1c of the insertion side bare optical fiber 1a abuts on a posh son that is largely displaced from the apex of the solid refractive index matching material 321 at an opposite side (if the groove bottom of the aligning groove 38a.

When the interposing member 41 is removed from the clamp portion 33 in a state shown in FIG. 7, the insertion side bare optical fiber 1a is pressed toward a groove bottom of the aligning groove 38a by the front element 361 approaching the base side element 35 due to elasticity of the spring 37 of the clamp portion 33. The inventors found that the tip of the insertion side bare optical fiber 1a, which is pressed from the state shown in FIG. 7 toward the groove bottom of the aligning groove 38a by the front element 361, presses the solid refractive index matching material 321 toward the groove bottom of the aligning groove 38a, and this causes peeling of the solid refractive index matching material 321 from the rear end surface 32a of the built-in optical fiber. In addition, the inventors found that even when the solid refractive index matching material 321 does not peel off from the rear end surface 32a of the built-in optical fiber by pressing force acting from the tip of the insertion side bare optical fiber 1a pressed from the state shown in FIG. 7 toward the groove bottom of the aligning groove 38a, there is a possibility that the solid retractive index matching material 321 is damaged which can cause entering of bubbles between the tip surface 1c of the insertion side bare optical fiber and the solid refractive index matching material 321.

In contrast, as shown in FIGS. 5A and 5C, in the configuration that the allowable displacement amount ΔH of the tip of the insertion side bare optical fiber 1a between the front element 361 and the base side element 35 is limited to 50% or less of the diameter (cladding diameter) of the built-in optical fiber 32, when the interposing member 41 is removed from the clamp portion 33 in an open state, the tip (tip surface 1c) of the insertion side bare optical fiber 1a, which is pressed by the front element 361 which approaches to the base side element 35 by elasticity of the spring 37 of the clamp portion 33, can be smoothly displaced toward the groove bottom of the aligning groove 38a while sliding along the solid refractive index matching material 321. As a result, when the tip of the insertion side bare optical fiber 1a is held and fixed between the front element 361 and the base-side element 35, peeling of the solid refractive index matching material 321 from the rear end surface 32a of the built-in optical fiber or the damage which may cause entering of bubbles between the tip surface 1c of the insertion side bare optical fiber and the solid refractive index matching material 321.

Therefore, in the present embodiment, a portion between a mold field portion of the built-in optical fiber 32 and a mold field portion of the insertion side bare optical fiber 1a can be embedded with the soft solid refractive index matching material 321 which functions as a cushion layer, and it is possible to reliably realize an optical connection having low loss between the optical fibers 32 and 1a.

In the configuration that the allowable displacement amount ΔH of the tip of the insertion side bare optical fiber 1a is limited to 50% or less of the diameter of the built-in optical fiber 32, the tip of the insertion side bare optical fiber 1a inserted between the base side element 35 of the clamp portion 33 in the open state and the front element 361 can he abut on a top portion (i.e., apex or periphery thereof) of the solid refractive index matching material 321.

The portion of the solid refractive index matching material 321 on which the tip of the insertion side bare optical fiber 1a is abut is deformed along the tip surface 1c of the insertion side bare optical fiber. In the configuration that the allowable displacement amount ΔH of the tip of the insertion side bare optical fiber 1a is limited to 50% or less of the diameter of the built-in optical fiber 32, the solid refractive index matching material 321 deformed by abutting the tip of the insertion side bare optical fiber 1a does not include a portion which is abut on a side surface of the tip of the insertion side bare optical fiber 1a or if it includes such portion, the portion is quite small, in addition, the solid refractive index matching material 321 deformed by abutting the tip of the insertion side bare optical fiber 1a does not include a portion, which is abuttable on a side surface of the tip of the insertion side bare optical fiber 1a and deforms from a position separated from an inner surface of the aligning groove 38 a toward the groove-bottom of the aligning groove 38a by removing the interposing member 41 interposed between the base side element 35 and the front element 361, or if it includes such portion, the portion is quite small. In the configuration that the allowable displacement amount ΔH of the tip of the insertion side bare optical fiber 1a is limited to 50% or less of the diameter of the built-in optical fiber 32, the solid refractive index matching material 321 does not become an obstacle for the displacement of the tip of the insertion side bare optical fiber 1a moves toward the groove bottom of the aligning groove 38a.

Therefore, in the configuration that the allowable displacement amount ΔH of the tip of the insertion side bare optical fiber 1a is limited to 50% or less of the diameter of the built-in optical fiber 32, when the interposing member 41 interposed between the base side element 35 and the front element 361 is removed, the displacement of the insertion side bare optical fiber 1a from a position separated from an inner surface of the aligning groove 38a toward the groove bottom of the aligning groove 38a is smoothly realized by sliding between the tip of the insertion side bare optical fiber 1a and the solid refractive, matching material 321.

As a result, by removing the interposing member 41 interposed between the base side element 35 and the from element 361, even when the displacement of the tip of the insertion side bare optical fiber 1a which is in a state of being abut on the solid refractive index matching material 321 is occurred, from a position separated from an inner surface of the aliening groove 38a toward the groove bottom of the aligning groove 38a. the damage or the peeling from the rear end surface 32a of the built-in optical fiber of the solid refractive index matching material 321 can be avoided.

The rear-side extension por ion 322 of the matching material-attached optical fiber 320 is abut on the inner surface of the aligning groove 38a by rigidity of the built-in optical fiber 32 and is arranged so as to extend along the aligning groove 38a.

In the configuration that the allowable displacement amount ΔH of the tip of the insertion side bare optical fiber 1a is limited to 50% or less of the diameter of the built-in optical fiber 32, the tip of the insertion side bare optical fiber 1a interposed between the base side element 35 of the clamp portion 33 in the open state and the front element 361 is abut on a position displace from the apex of the solid refractive index matching material 321 when the position of the apex of the solid refractive index matching material 321 is slightly displaced to the groove bottom side of the aligning groove 38a with respect to the virtual extension of the optical axis 32b of the rear end of the built-in optical fiber. In this case, the tip of the insertion side bare optical fiber 1a is abut on the apex of the solid refractive index matching material 321 or a position which is slightly displaced to the side of the pressing element 36 from the apex.

However, even when there is a displacement from the apex of the solid refractive index matching material 321 regarding an abut position of the tip of the insertion side bare optical fiber 1a with respect to the solid refractive index, matching material 321, the displacement amount (the amount of displacement from an apex of the solid refractive index matching material 321) remains small. The displacement of the tip of the insertion side bare optical fiber 1a, which is in a state of being abut on the solid refractive index matching material 321, from a position separated from the inner surface of the aligning groove 38a toward, the groove bottom of the aligning groove 38a when the interposing member 41 interposed between the base side element 35 and the front element 361 is removed is smoothly realized by sliding between the tip of the insertion side bare optical fiber 1a and the solid refractive index matching material 321. Feeling of the solid refractive index matching material 321 from the rear end surface 32a of the built-in optical fiber or damage due to the displacement of the tip of the insertion side bare optical fiber 1a do not occur.

The opening angle θ of the front, element 361 of the clamping portion 33 in the maximum opening state with respect to the base side element 35 is preferably 5 degrees or less.

(Another Embodiment)

FIGS. 8A and 8B show an optical fiber connector 70 according to another embodiment of the present invention.

As shown in FIGS. 8A and 8B, the optical fiber connector 70 is a so-called mechanical splice.

In the optical fiber connector 70, an elongated base side element 71 (base member), and three pressing elements 81, 82, and 83 (pressing members) which are installed so as to be arranged in one row along a longitudinal direction of the base side element 71 are accommodated and held inside a spring 76 which is formed by processing a metal sheet and extends in a C or U sectional shape (in the shown example, a C sectional shape). The spring 76 functions as a biasing member which elastically biases the pressing element 81, 82, and 83 toward the base side element 35.

Each of the three cover side elements 81, 82, and 83 shown in FIG. 8B functions as a pressing member which presses the optical fibers (matching material-attached optical fiber 720 and second optical fiber 73 described below) disposed between the cover side elements and the base side element 71 to the base side element 71 by elasticity of the spring 76.

Hereinafter, the cover side elements 81, 82, and 83 are also referred to as pressing elements.

As shown in FIG. 8B, for example, the optical fibers 720 and 73 in which the tips are butted to each other are held and fixed between the pressing elements 81, 82, and 83 and the base side element 71 by the optical fiber connector 70, and it is possible to maintain an optical connection state between the optical fibers 720 and 73. The tips of the optical fibers 720 and 73 are disposed so as to be optically connected to each other between the second pressing element 82 positioned at the center of the arrangement among the three pressing elements 81, 82, and 83 and the base side element 71, and the optical fibers 720 and 73 axe optically connected to each other.

FIGS. 8A and 8B show a state where the tip of the optical fiber 72 (hereinafter, also referred to as a first optical fiber) is held and fixed between the first, pressing element 81 positioned at one end of the arrangement among the three pressing elements 81, 82, and 83 and the base side element 71. The first pressing element 81 holds and fixes the first optical fiber 72 between the first pressing element 81 and the base side element 71 by elasticity of the spring 76.

The solid refractive index matching material 321 is provided on the tip of the first optical fiber 72 which is disposed between the first pressing element 81 and the base side element 71. The solid refractive index matching material 321 shown in FIG. 8B is formed in a partially spherical shape.

Hereinafter, an optical fiber in which the solid refractive index matching material 321 is provided on the tip of the optical fiber (first optical fiber 72) is also referred to as the matching material-attached optical fiber 720.

In FIG. 8B, the solid refractive index matching material 321 of the tip of the matching material-attached optical fiber 720 is disposed between the second pressing element 82 positioned at the center in the arrangement among the three pressing elements 81, 82, and 83 and the base side element 71.

The three pressing dements 81 to 83 can be individually opened and closed with respect to the base side dement 71 by insertion and detachment of the interposing member 40 into and from portions between the three pressing elements 81 to 83 and the base side element 71.

In FIG. 8A, reference numeral 411 is assigned to the interposing member 40 which is interposed between the first pressing element 81 and the base side element 71, reference numeral 412 is assigned to the interposing member 40 which is interposed between the second pressing element 82 and the base side element 71, and reference numeral 413 is assigned to the interposing member 40 which is interposed between the third pressing element 83 and the base side element 71.

The matching material-attached optical fiber 720 can be inserted into and detached from the portions between the first and second pressing elements 81 and 82 and the base side element 71 in a state where the first and second pressing elements 81 and 82 are opened with respect to the base side element 71 using the interposing members 41 and 42.

The tip portion of the second optical fiber 73 (another optical fiber, and hereinafter, also referred to as an insertion optical fiber) which is optically connected to the matching material-attached optical fiber 720 is disposed between the second and third pressing elements 82 and 83 and the base side element 71. The second optical fiber 73 can be inserted into and detached from the portions between, the second and third pressing elements 82 and 83 and the base side element 71 in a state where the second and third pressing dements 82 and 83 are opened with respect to the base side element 71 using the interposing members 42 and 43.

In FIGS. 8A and 8B, specifically, the first optical fiber 72 and the second optical fiber 73 are coated optical fibers which are referred to as a single-core optical fiber core wire or a single-core optical fiber wire.

In a state where coating materials of tip portions of the first optical fiber 72 and the second optical fiber 73 are removed and bare optical fibers 72a and 73a are led out, the first optical fiber 72 and the second optical fiber 73 are inserted into portions between the base side element 71 and the pressing elements 81 to 83.

The bare optical fibers 72a and 73a led out from the tip portions of the first optical, fiber 72 and the second optical fiber 73 are disposed between the second pressing element 82 and the base side element 71 of the optical fiber connector 70. A coating portion 72b which is a portion in which the bare optical fiber 72a of the first optical fiber 72 is covered by a coating material is disposed between the first pressing element 81 and the base side element 71 of the optical fiber connector 70. A coating portion 73b which is a portion in which the bare optical fiber 73a of the second optical fiber 73 is covered by a coating material is disposed between the third pressing element 81 and the base side element 71 of the optical fiber connector 70.

In addition, specifically, the solid refractive index matching material 321 of the matching material-attached optical fiber 720 is provided on the tip surface of the bare optical fiber 72a which is led out from the tip portion of the first optical fiber 72.

The solid refractive index matching material 321 having a partially spherical shape is provided on the tip of the bare optical fiber 72a so that an apex at which a protrusion dimension from the tip surface of the bare optical fiber 72a is the maximum value is positioned on a virtual extension of a center portion of the tip surface of the bare optical fiber 72a in a direction of an optical axis of the tip of the bare optical fiber 72a.

As shown in FIGS. 8A and 8B, the optical fiber connector 70 extends with the longitudinal direction of the base side element 71 as a longitudinal direction of the optical fiber connector 70, and the entire optical fiber connector 70 is formed in an elongated shape.

As shown in FIG. 8B, an aligning groove 75 is formed on a surface of the base side element 71 facing the second pressing element 82 so as to extend in a longitudinal direction of a connector.

The bare optical fiber 72a and the solid refractive index matching material 321 of the tip portion of the matching material-attached optical fiber 720 are accommodated in the aligning groove 75. The bare optical fiber 73a which is led out from the insertion optical fiber 73 is accommodated in the aligning groove 75, and the tip of the bare optical fiber 73a abuts on the tip (solid refractive index matching material 321) of the matching material-attached, optical fiber 72. The aligning groove 75 can position and align the bare optical fiber 73a of the insertion optical fiber 73 and the tip of the matching material-attached optical fiber 720 so that the bare optical fiber 73a can be butt-connected to the tip of the matching material-attached optical fiber 720.

In the optical fiber connector 70, a member in which the tip of the matching material-attached optical fiber 720 inserted between the first arid second pressing elements 31 and 82 and the base side element 71 is held and fixed between the first pressing element 81 and the base side element 71 is referred to as a pigtail-attached connector 70A.

A method of optically-connecting the second optical fiber 73 to the matching material-attached optical fiber 720 using the optical fiber connector 70 (i.e., method of assembling the optical fiber connection portion) can include a method using the pigtail-attached connector 70A.

The pigtail-attached connector 70A functions as an optical fiber connector for optically connecting the bare optical fiber 72a of the first optical, fiber 72, which is held and fixed between the first pressing element 81 and the base side element 71, to the bare optical fiber 73a of the second optical fiber 73, which is separately inserted between the second pressing element 82 and the base side element 71.

In the method of assembling the optical fiber connection portions described above, the second optical fiber 73 is inserted between the base side element 71 of the pigtail-attached connector 70A and the second and third pressing elements 82 and 83 opened with respect to the base side element 71 using the interposing members 42 and 43, and the tip of the second optical fiber 73 abuts on the tip (solid refractive index matching material 321) of the matching material-attached optical fiber 720. Sequentially, in the state where the abutment is maintained, the interposing member 40 is removed from the portions between the second pressing element 82 and the third pressing element 83, and the base side element 71.

Accordingly, the bare optical fiber 72a of the tip portion of the matching material-attached optical fiber 720, the solid refractive index matching material 321, and the bare optical fiber 73a of the tip portion of the insertion optical fiber 73 can be held and fixed between the second pressing element 82 and the third pressing element 83, and the base side element 71. As a result, in the optical fiber connector 70, an optical fiber connection structure in which an optical connection state between the matching material-attached optical fiber 720 and the insertion optical fiber 73 is maintained can he realized.

The insertion optical fiber 73 is optically connected to the first optical fiber 72 via the solid refractive index matching material 321 of the tip of the matching material-attached optical fiber 72.

In the method of assembling the optical fiber connection portions, holding and fixing of the first optical fiber 72 is maintained by the first pressing element 81 and the base side element 71 of the pigtail-attached connector 70A.

As shown. In FIGS. 8A and 8B, the spring 76 of the optical fiber connector 70 is formed in an elongated shape which extends with the longitudinal direction of the connector as a longitudinal direction of the spring 76. The spring 76 is divided into three regions (individual spring regions), which function as springs elastically biasing each pressing element (pressing element) toward the base side element 71, by slits 76a which are formed at two locations in the longitudinal direction. The slit 76a is formed so as to extend in the circumferential direction of the spring 76 from each o f both ends of the slit 76a facing an opening portion in a C shaped or U shaped cross-section perpendicular to the longitudinal direction of the spring 76. The three individual spring regions of the spring 76 are secured so as to correspond to the three pressing elements 81, 82, and 83. Each of the three pressing elements 81, 82, and 83 can be independently opened and closed with respect to the base side element 71.

Accordingly, the first pressing element 81 of the pigtail-attached connector 70A can stably maintain the state where the first optical fiber 72 is held and fixed between the first pressing element 81 and the base side element 71 without being affected by opening and closing of the second and third pressing elements 82 and 83 with respect to the base side element 71.

The portion from the second pressing element 82 to the first pressing element 81 side in the longitudinal direction of the connector (longitudinal direction of the optical fiber connector 70) of the pigtail-attached connector 70A functions as a fiber-fixing portion 74 which holds and fixes the matching material-attached optical fiber 720 (specifically, the first optical fiber 72). Specifically, the fiber-fixing portion 74 of the pigtail-attached connector 70A shown in FIGS. 8A and 8B holds and fixes the coating portion 72b of the first optical fiber 72.

The portion held by the fiber-fixing portion 74 of the matching material-attached optical fiber 720 is fixed to the base side element 71.

In addition, the portion from the fiber-fixing portion 74 of the optical fiber connector 70 to the second pressing element 82 side in the longitudinal direction of the connector functions as a clamp portion 77 which can hold and fix the tip portion of insertion optical fiber 73 along with the bare optical fiber 72a of the tip portion of the matching material-attached optical fiber 720 and the solid refractive index matching material 321.

The second optical fiber 73 and the first optical fiber 72 can be optically connected to each other via the solid refractive index matching material 321.

Hereinafter, the bare optical fiber 72a of the first optical fiber 72 is also referred to as a first bare optical fiber 72a, and the bare optical fiber 73a of the second optical fiber 73 is also referred to as a second bare optical fiber 73a.

A tip surface of the first bare optical fiber 72a is a fiat surface which is perpendicular to an optical axis of the tip of the first bare optical fiber 72a or a curved surface subjected to PC grinding.

The relationship between the tip of the first, bare optical fiber 72a and the solid refractive index matching material 321 in the tip of the matching material-attached optical fiber 720 is similar to the relationship between the rear end portion of the built-in optical fiber 32 and the solid refractive index matching material 321 in the optical connector 10 described above.

The deviation allowance of the apex of the solid refractive index matching material 321 in a vertical direction with respect to the optical axis of the tip of the first bare optical fiber 72a is similar to the case of the relationship between the rear end of the built-in optical fiber 32 and the solid refractive index matching material 321 in the optical connector 10 described above. In addition, a thickness of the solid refractive index matching material 321 in an extension line of the optical axis of the tip of the first bare optical fiber 72a is similar to the thickness of the solid refractive index matching material 321 In the optical connector 10 described above.

In a state where the second pressing element 82 is opened with respect to the base side element 71 by the interposing member 42, the pigtail-attached connector 70A has a configuration such that the allowable displacement amount (axis deviation allowance) of the tip of the second bare optical fiber 73a between the second pressing element 82 and the base side dement 71 with respect to a virtual extension of an optical axis of a tip of the first bare optical fiber 72a is 50% or less of the diameter of the first bare optical fiber 72a (cladding diameter of the first optical fiber 72).

Therefore, when the optical fibers 72 and 73 are optically connected to each other, the pigtail-attached connector 70 can prevent the solid refractive index matching material 321 at the tip of the first bare optical fiber 72a from being peeled off from the tip of the first bare optical fiber 72a. As a consequence, m the pigtail-attached connector 70, it is reliably realized that the solid refractive index matching material 321 can be filled in without space between mode field portions of tips of the first bare optical fiber 72a and the second bare optical fiber 73a and a low-loss optical connection between the optical fibers 72 and 73 can be realized.

In addition, the present invention is not limited to the above-described embodiments, and can be appropriately modified within a scope which does not depart from the gist.

In FIGS. 3 and 5A to 5C, as the built-in optical fiber 32, the optical fiber is used in which the rear end surface 32a (the tip surface of the rear side extension portion 322, and hereinafter, also referred to as a perpendicular rear end surface) perpendicular to the optical axis is formed on the rear end of the built-in optical fiber 32. The rear end surface of the first optical fiber shown in FIG. 8B is formed so as to be perpendicular to the optical axis positioned at the center of the first optical fiber.

Hereinafter, the built-in optical fiber of the optical connector or the first optical fiber of a pigtail-attached connector, that is, an optical fiber to which the solid refractive index matching material is attached, is referred to as a target optical fiber having a matching material. For example, the tip surface of the target optical fiber having a matching material to which the solid refractive index matching material is attached may be tin inclined surface (flat surface, and hereinafter, also referred to as an inclined tip surface) which is inclined by approximately 7 to 9 degrees with respect to a virtual vertical surface perpendicular to the optical axis of the center built-in optical fiber.

The apex of the solid refractive index matching material having a partially spherical shape provided on an inclined rip surface indicates a location where a protrusion dimension with respect to a virtual vertical surface of a tip of the first optical fiber in the solid refractive index matching material is at maximum. Meanwhile, also in this case, an apex of the solid refractive Index matching material is positioned at a virtual extension from the center of the tip surface of the target optical fiber having a matching material in a direction of the optical ax is of the tip of the target optical fiber having a matching material.

However, the thickness D of the solid refractive index matching material (i.e., "the thickness of a matching material" in FIG. 9) with respect to the tip surface of the target optical fiber having a matching material indicates a coating thickness of the solid refractive index matching material positioned on the extension of the optical axis of the tip of the target optical fiber having a matching material.

When the tip surface of the target optical fiber having a matching material is a surface which corresponds to a virtual vertical surface of the tip of the first optical fiber or a partially spherical shape which has been subjected to PC grinding, the tip surface of the second optical fiber optically connected to the target optical fiber having a matching material is formed so as to be perpendicular to the optical axis of the center insertion side bare optical fiber. In addition, when the op surface of the target optical fiber having a matching material is an inclined tip surface, preferably, the tip surface of the second optical fiber is a flat inclined surface which is inclined with respect to a virtual plane perpendicular to the optical axis of the tip of the second optical fiber at an inclination angle which approximately coincides with the inclination angle with respect to a virtual vertical surface perpendicular to the optical axis of the center on the inclined tip surface of the target optical fiber having a matching material.

As the solid retractive index matching material 321, the solid refractive index matching material 321 of the region R1 shown in FIG. 9 can be preferably used regardless of the configuration of the tip surface of the target optical fiber having a matching material.

The fiber-fixing portion of the optical fiber connector may adopt any configuration as long as the first optical fiber can be fixed to the base member and is not limited to the configurations which are described in the embodiments.

As the front element 361 of the optical, connector 10 in FIG. 1 and the second pressing element 82 of the optical fiber connector 70 in FIG. 8B, the pressing member (pressing element) which presses the bare optical fiber led out from the tip of the second optical fiber and the bare optical fiber led out from the tip of the first optical fiber to the base side element (base member) is referred to as a connection-portion pressing member hereinbelow.

As an optical fiber connector, it is possible to employ a configuration such that the pressing member which presses a coating portion of the second optical fiber to the base member and the connection-portion pressing member is a single member, not a separate member.

For example, in the clamp portion 33 of the clamp portion-attached ferrule 30 in FIG. 1, the clamp portion 33 is not limited to be configured by the pressing element 36 including two members such as the front element 361 and the rear element 362, and can employ a configuration that the pressing element is configured by single member.

In addition, as an optical fiber connector, the present invention is not limited to the configuration in which the aligning groove is formed on the base side element, and may also use a configuration in which the aligning groove is formed on the cover side element.

The housing of the optical connector accommodating the clamp portion-attached ferrule is not particularly limited. For example, a configuration, lit which an interposing member insertion hole is formed in a housing such as a SC type optical connector, a so-called SC2 type optical connector (a knob is omitted from the SC type optical connector), or a MU type optical connector, or the like may be employed.

In the above-described embodiments, the optical connector (interposing member-attached optical connector) having the configuration in which the interposing member is interposed between the elements in advance and the portion between the elements is opened is exemplified as an optical connector. However, the optical connector is not limited, to this, and may also utilize a configuration in which the interposing member is not inserted into the portion between the elements of the clamp portion of the clamp portion-attached ferrule, and the operation of inserting the interposing member into the portion between the elements and opening the portion between the elements is performed when the operation of inserting the insertion optical fiber into the portion between the elements is performed.

As an optical fiber connector (including an optical connector), a configuration is employed such that by the clamp portion and the interposing member interposed between the connection-portion pressing member and the base member, the allowable displacement amount (axis deviation allowance) of the tip of the second bare optical fiber between the connection-portion pressing member in an open state and the base member with respect to a virtual extension of an optical axis of a tip of the first bare optical fiber is 50% or less of the diameter of the first bare optical fiber (cladding diameter of the first optical fiber).

The clamp portion-attached ferrule itself can be used as an optical connector.

As an optical connector, it is not necessarily limited to a structure including a housing which accommodates the clamp portion-attached ferrule.

As an optical connector, a structure which does not include a housing accommodating the clamp portion-attached ferrule and is configured by a clamp portion-attached ferrule itself can be employed.

In the above-described embodiments, the clamp portion is shown that has a configuration including the base member (base side element) and the pressing member (pressing element) which is separate from the base member.

However, as a clamp portion, for example, it is possible to employ a configuration including the base member and the pressing member which is connected to the base member via a hinge portion and is opened and closed by rotation with respect to the base member.

As a means for pressing a pressing member towards a base member (pressing means), it is not limited to a spring of a clamp portion described above. As a means for pressing a pressing member towards a base member, for example, a slide member (sliding pressing member) can be employed that is formed in a frame shape accommodating the base member and the pressing member and slidably moves with respect to the base member and the pressing member. As the clamping portion employing the sliding pressing member, there is a configuration such that the pressing member is pressed to the base member by making the sliding pressing member get on a convex portion projecting horn an opposite side of an opposing surface of at least one or both of the base member and the pressing member due to a slide movement of the sliding pressing member with respect to the base member and the pressing member. Due to the slide movement with respect to the base member and pressing member, the sliding pressing member is released from getting on a convex portion, and thereby, the slide pressing member allows to release pressing of a pressing member with respect to the base member and to open.

In addition, as a clamp portion in which a slide-pressing member is employed, a configuration can be adapted such that the sliding pressing member accommodating a base member and the pressing member, which are connected through a hinge portion, and are provided so as to be openable and closable by opposing the respective opposing surfaces each other, is separated from a rotation center of the hinge portion due to the slide movement with respect to the base member and the pressing member to increase a separation distance, thereby, the pressing member is pressed toward the base member via the sliding pressing member.

DESCRIPTION OF THE REFERENCE SYMBOLS

1: second optical fiber (insertion optical fiber)
1A: the second optical fiber (insertion optical fiber, holes-including optical fiber)
10: optical fiber connector (optical connector)
20: housing
30: damn portion-attached ferrule
31: fiber-fixing portion (ferrule)
31a: joining end surface
31b: fiber hole
32: first optical fiber (built-in optical fiber)
32a: tip surface (rear end surface)
320: matching material-attached optical fiber
321: solid refractive index matching material
33: clamp portion
35: base member (base side element)
35f: opposing surface
36: pressing member (pressing element)
361: pressing member (pressing element, front element)
361f: opposing surface
362: pressing member (pressing element, rear element)
362f: opposing surface
37: spring
38a: aligning portion (aligning groove)
40,41,42: the interposing member
70: optical fiber connector (mechanical splice)
71: base member (base side element)
72: first optical fiber
720: matching material-attached optical fiber
73: second optical fiber (insertion optical fiber)
74: fiber-fixing portion
77: clamp portion
81: pressing member (first pressing element)
82: pressing member (second pressing element)
83: pressing member (third pressing element)

The invention claimed is:

1. An optical fiber connector comprising:
a fiber fixing portion;
a first optical fiber fixed to the fiber fixing portion, the first optical fiber comprising an extending portion that extends from the fiber fixing portion;
a second optical fiber having the same cladding diameter as the first optical fiber and that is configured to be optically connected to the extending portion of the first optical fiber;
a clamp portion comprising a base member and a pressing member that is openable and closable with respect to the base member, wherein
the clamp portion holds and fixes the extending portion of the first optical fiber and a tip portion of the second optical fiber between the base member and the pressing member; and
a solid index matching material that is attached to a tip surface of the extending portion of the first optical fiber and is interposed between the first optical fiber and the second optical fiber,
wherein the solid refractive index matching material is formed in a partially spherical shape comprising an apex on an extension from a center of the tip surface of the extending portion of the first optical fiber,
wherein the base member comprises an aligning groove that aligns the second optical fiber to the first optical fiber when the pressing member is closed with respect to the base member,
wherein the second optical fiber that is movably disposed between the base member and the pressing member opened with respect to the base member has an allowable displacement amount $\Delta H$ which is 50% or less of the cladding diameter of the first optical fiber in a direction perpendicular to a virtual extension of the first optical fiber, a displacement of the second optical fiber in a direction of a width of the aligning groove is regulated by the aligning groove, and a tip of the second optical fiber is always abut on a top portion of the solid refractive index matching material when the second optical fiber is abut on the first optical fiber via the solid refractive index matching material.

2. The optical fiber connector according to claim 1, wherein the clamp portion comprises a spring that elastically biases the pressing member toward the base member, and
wherein the pressing member of the clamp portion is opened with respect to the base member by an interposing member that is interposed between the pressing member and the base member so as to be insertable and detachable by the elasticity of the spring.

3. The optical fiber connector according to claim 2, wherein an opening angle between opposing surfaces of the base member of the clamp portion and the pressing member opened with respect to the base member, the opposing surfaces opposing each other, is 5 degrees or less.

4. The optical fiber connector according to claim 3, wherein the fiber-fixing portion is a ferrule to which the first optical fiber is inwardly inserted and fixed, and
wherein the base member of the clamp portion is integrally provided on the ferrule.

5. The optical fiber connector according to claim 2, wherein the fiber-fixing portion is a ferrule to which the first optical fiber is inwardly inserted and fixed, and
wherein the base member of the clamp portion is integrally provided on the ferrule.

6. The optical fiber connector according to claim 1, wherein an opening angle between opposing surfaces of the base member of the clamp portion and the pressing member opened with respect to the base member, the opposing surfaces opposing each other, is 5 degrees or less.

7. The optical fiber connector according to claim 6, wherein the fiber-firing portion is a ferrule to which the first optical fiber is inwardly inserted and fixed, and
wherein the base member of the clamp portion is integrally provided on the ferrule.

8. The optical fiber connector according to claim 1, wherein the fiber-fixing portion is a ferrule to which the first optical fiber is inwardly inserted and fixed, and
wherein the base member of the clamp portion is integrally provided on the ferrule.

* * * * *